United States Patent
Na et al.

(10) Patent No.: US 8,257,878 B2
(45) Date of Patent: Sep. 4, 2012

(54) SEMI-PASSIVE TYPE FUEL CELL SYSTEM

(75) Inventors: Youngseung Na, Yongin-si (KR);
Junwon Suh, Yongin-si (KR); Jeong Seob Shin, Daejeon (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1131 days.

(21) Appl. No.: 11/585,346

(22) Filed: Oct. 19, 2006

(65) Prior Publication Data
US 2007/0099061 A1    May 3, 2007

(30) Foreign Application Priority Data

Oct. 20, 2005 (KR) .......... 10-2005-0098952
Oct. 20, 2005 (KR) .......... 10-2005-0098953
Oct. 20, 2005 (KR) .......... 10-2005-0098954
Oct. 20, 2005 (KR) .......... 10-2005-0099279
Oct. 20, 2005 (KR) .......... 10-2005-0099280
Oct. 20, 2005 (KR) .......... 10-2005-0099281

(51) Int. Cl.
*H01M 8/24* (2006.01)
*H01M 8/04* (2006.01)

(52) U.S. Cl. .......... 429/458; 429/452; 429/434

(58) Field of Classification Search .......... 429/12–46, 429/410, 444, 452, 456–461, 482–483, 492, 429/517–518, 434–436, 439
See application file for complete search history.

(56) References Cited

U.S. PATENT DOCUMENTS 3,429,122 A * 2/1969 Pravda et al. .......... 60/487
5,753,384 A * 5/1998 Kimberg .......... 429/27
5,853,910 A * 12/1998 Tomioka et al. .......... 429/17
5,935,725 A * 8/1999 Dhar et al. .......... 429/12
6,010,800 A * 1/2000 Stadnick et al. .......... 429/120

(Continued)

FOREIGN PATENT DOCUMENTS

EP    0911898 A1    4/1999

(Continued)

OTHER PUBLICATIONS

Patent Abstracts of Japan, Publication No. 2003-017107, dated Jan. 17, 2003, in the name of Kenji Kato et al.

(Continued)

*Primary Examiner* — Basia Ridley
*Assistant Examiner* — Jacob Buchanan
(74) *Attorney, Agent, or Firm* — Christie, Parker & Hale, LLP

(57) ABSTRACT

A semi-passive fuel cell system is provided. A stack in which a plurality of unit cells are laterally stacked with one another is provided. Each unit cell includes a membrane-electrode assembly and bipolar plates located on both sides of the membrane-electrode assembly. The membrane-electrode assembly includes an electrolyte membrane, a cathode electrode, and an anode electrode. The cathode and anode electrodes, respectively, are formed on each side of the electrolyte membrane. Also provided are a means for supplying fuel and a means for supplying air. Each of the bipolar plates has air paths formed on a surface facing the cathode electrode and extending from an upper end to a lower end of the bipolar plate. The air supply means includes ducts which are respectively installed on an upper end and a lower end of the stack, and includes a means for blowing air through the ducts.

38 Claims, 22 Drawing Sheets

U.S. PATENT DOCUMENTS

| | | | | |
|---|---|---|---|---|
| 6,099,983 | A | * | 8/2000 | Nakagaki et al. ............... 429/13 |
| 6,146,779 | A | * | 11/2000 | Walsh ........................... 429/423 |
| 6,322,919 | B1 | * | 11/2001 | Yang et al. .................... 429/457 |
| 6,361,891 | B1 | * | 3/2002 | Breault et al. ................. 429/413 |
| 6,503,650 | B1 | | 1/2003 | Yasuo et al. |
| 6,706,436 | B2 | * | 3/2004 | Molter ........................... 429/34 |
| 2002/0081483 | A1 | | 6/2002 | Nemoto et al. |
| 2002/0157359 | A1 | * | 10/2002 | Stenersen et al. ............ 55/350.1 |
| 2003/0064271 | A1 | | 4/2003 | Stenersen |
| 2003/0157392 | A1 | | 8/2003 | Zhang et al. |
| 2005/0079393 | A1 | * | 4/2005 | Shu et al. ........................ 429/13 |
| 2005/0171659 | A1 | * | 8/2005 | Okazaki .......................... 701/22 |
| 2005/0249993 | A1 | * | 11/2005 | Horiuchi et al. ................ 429/32 |

FOREIGN PATENT DOCUMENTS

| | | | |
|---|---|---|---|
| JP | 57-123661 | | 8/1982 |
| JP | 57-130380 | * | 8/1982 |
| JP | 59-134570 | | 8/1984 |
| JP | 63-000972 | | 1/1988 |
| JP | 04-355061 | | 12/1992 |
| JP | 08-213044 | | 8/1996 |
| JP | 2000-285951 | | 10/2000 |
| JP | 2001-6717 | | 1/2001 |
| JP | 2003-17107 | | 1/2003 |
| JP | 2003-36878 | | 2/2003 |
| JP | 2003-515910 | T | 5/2003 |
| WO | WO 99/28985 | | 6/1999 |

OTHER PUBLICATIONS

Patent Abstracts of Japan, Publication No. 2003-036878, dated Feb. 7, 2003, in the name of Nobuhiko Hirai et al.

Patent Abstracts of Japan for Publication No. 2001-006717, published on Jan. 12, 2001 in the name of Morohiro Tomimatsu, et al.

Japanese Office action dated Sep. 14, 2010, for corresponding Japanese Patent application 2006-286242.

Patent Abstracts of Japan and English machine translation of Japanese Publication 08-213044.

English machine translation of Japanese Publication 2003-515910, also corresponds to U.S. Patent 6,403,247.

Japanese Interrogation dated Jul. 10, 2012, for corresponding Japanese Patent application 2006-286242 (2 pages).

Patent Abstracts of Japan, and English machine translation of Japanese Publication 2000-285951, (5 pages).

* cited by examiner

SEMI-PASSIVE TYPE FUEL CELL SYSTEM

CROSSED-REFERENCES TO RELATED APPLICATIONS

This application claims priority to and the benefit of Korean Patent Application No.10-2005-0098952 filed on Oct. 20, 2005, Korean Patent Application No. 10-2005-0098953 filed on Oct. 20, 2005, Korean Patent Application No. 10-2005-0098954 filed on Oct. 20, 2005, Korean Patent Application No. 10-2005-0099281 filed on Oct. 20, 2005, Korean Patent Application No. 10-2005-0099280 filed on Oct. 20, 2005, and Korean Patent Application No. 10-2005-0099279 filed on Oct. 20, 2005, all filed in the Korean Intellectual Property Office, the entire contents of which are incorporated herein by reference.

BACKGROUND OF THE INVENTION

1. Field of the Invention

The present invention relates to a semi-passive type fuel cell system, and more particularly, to a semi-passive type fuel cell system having air uniformly supplied to air paths formed in a bipolar plate of a fuel cell stack.

2. Description of the Prior Art

As is generally known in the art, a fuel cell is an electricity generation system which directly converts chemical reaction energy generated between hydrogen contained in a hydrocarbon-based fuel such as methanol, ethanol and natural gas and an oxidant, into electrical energy.

Fuel cell systems are largely classified into a polymer electrolyte membrane fuel cell (hereinafter, referred to as a "PEMFC") system and a direct methanol fuel cell (hereinafter, referred to as a "DMFC") system.

In general, the PEMFC system includes a stack for generating electrical energy Through reaction between hydrogen and oxygen and a reformer for generating hydrogen through reforming a fuel. While the PEMFC system has great energy density and high output, hydrogen gas must be carefully handled, and the PEMFC requires an additional facility such as a reformer for reforming the fuel such as methanol, ethanol and natural gas and thereby producing hydrogen as fuel gas.

In the DMFC system, methanol as a fuel and oxygen as an oxidant are directly supplied to a stack to produce electricity through electrochemical reaction. The DMFC system has high energy density and high power density. Also, because a liquid fuel such as methanol is directly used, an additional facility such as a reformer is not required, and it is easy to store and supply the fuel.

In the DMFC system, air is forcibly supplied to the stack using air supply means such as an air compressor, an air pump, or the like. Because the DMFC system can be carried about, applicability to a portable terminal such as a notebook computer, a mobile phone, and the like, is being considered. However, the air supply means used in the DMFC system creates high noise levels and therefore is likely to cause inconvenience to a user. In consideration of this fact, the DMFC system has been developed as a passive type DMFC system in which air is supplied to the stack through natural convection or as a semi-passive type DMFC system in which air is supplied to the stack by virtue of blowing means such as a blower.

In the passive type DMFC system, because air is supplied through natural convection, air cannot be sufficiently supplied to respective cathodes. Hence, in the passive type DMFC system, unit cells are not stacked but arranged on a plane, whereby the area occupied by the stack is increased.

On the other hand, in the semi-passive type DMFC system, because the blowing means such as a blower is used, an amount of supplied air is increased when compared to the passive type DMFC system. By this fact, in the semi-passive type DMFC system, unit cells can be stacked to form a stack. In this regard, Japanese Unexamined Patent Gazette 2001-6717 discloses a fuel cell body in which a pair of electrodes including a fuel electrode and an oxidant electrode is located. Referring to FIG. 39, in order to replenish oxygen used in electrode reaction by the oxidant electrode of a fuel cell body 1, blowing means 5 for supplying oxidant gas is provided to an oxidant gas entrance, and the sectional area of an oxidant gas path that is formed in the oxidant electrode is gradually decreased from the oxidant gas entrance toward an oxidant gas exit.

Nevertheless, the semi-passive type DMFC system suffers from defects in that, although the blower is used, it is difficult to uniformly supply air to the air paths which are formed in the bipolar plate of the stack. Also, due to a difference in resistance to air flow, which is caused by the positions of the air paths, the amounts of air supplied to the respective air paths are rendered non-uniform.

SUMMARY OF THE INVENTION

In accordance with the present invention a semi-passive type fuel cell system is provided in which a duct for connecting blowing means to the upper end of a stack is formed such that air can be uniformly supplied through the air paths formed in the bipolar plate of the stack.

According to one aspect of the present invention, a semi-passive type fuel cell system is provided. The semi-passive type fuel cell system includes a stack in which a plurality of unit cells are laterally stacked with one another. Each unit cell includes a membrane-electrode assembly and bipolar plates located on both sides of the membrane-electrode assembly. The membrane-electrode assembly has an electrolyte membrane, a cathode electrode, and an anode electrode. The cathode electrode is formed on one side of the electrolyte membrane and the anode electrode is formed on the other side of the electrolyte membrane. The semi-passive type fuel cell system also includes a means for supplying fuel and a means for supplying air. Each of the bipolar plates has air paths which are formed on a surface facing the cathode electrode and extending from an upper end to a lower end of the bipolar plate. The means for supplying air includes ducts which are respectively installed on an upper and a lower end of the stack and means for blowing air through the ducts. Each of the air paths of the bipolar plate may be formed in the shape of a straight line which extends from the upper end to the lower end of the stack.

In an embodiment, the ducts include a first duct which is installed on the upper end of the stack and a second duct which is installed on the lower end of the stack. The means for blowing air are installed to supply air from a first part of the first duct. The first duct has a first duct first part in which the means for blowing air is installed and a first duct second part that covers the entire upper end of the stack. An air suction opening is formed through an upper wall of the first duct first part directly above the means for blowing air. An air supply opening for supplying air to the stack is formed through a lower wall of the first duct second part to have an area corresponding to the area of the upper end of the stack. Further, an upper wall of the first duct second part is inclined downward to have a predetermined inclination angle so that a height of the upper wall gradually decreases from one end close to the means for blowing air to the other end of the upper wall. In addition, the first duct first part is formed to have a height which substantially corresponds to that of the means for blowing air. The means for blowing air is installed such that it sucks air through the air suction opening and then supplies the sucked air toward the first duct second part. Moreover, an air receiving opening for receiving air having passed through the stack is formed through an upper wall of the second duct to have an area corresponding to the area of the lower end of the stack. An air discharge opening for discharging air to the outside is formed through the other end of the second duct. A lower wall of the second duct is inclined downwards to have a predetermined inclination angle so that a height of the lower wall gradually increases from one end toward the other end of the second duct. Besides, the lower wall of the second duct is inclined at the same inclination angle as the upper wall of the first duct.

Also, in accordance with the present invention, the means for blowing air is a blower or a fan.

Also, in accordance with the present invention, the air paths of the bipolar plate are formed such that sectional areas of the air paths formed on one part of the bipolar plate are different from those of the air paths formed on the other part of the bipolar plate.

Further, in accordance with the present invention, the air paths of the bipolar plate are formed such that sectional areas of the air paths formed on the one part of the bipolar plate which faces the blowing means are greater than those of the air paths formed on the other part of the bipolar plate. The air paths of the bipolar plate are formed such that sectional areas of the air paths gradually decrease from the one part toward the other part of the bipolar plate.

Further, in accordance with the present invention, the air supply means further includes an air adjustment layer formed on the upper end of the stack to cover a zone including a region in which the air paths are formed. The air adjustment layer is coupled to the first duct to occupy the entire air supply opening.

Moreover, in accordance with the present invention, the air adjustment layer is formed of a porous material through which air can pass. The air adjustment layer is formed of a porous material having pores which possess sectional areas less than those of the air paths.

Furthermore, in accordance with the present invention, the air adjustment layer is formed as a gas-liquid separation layer by one or more of, but not limited to polytetrafluoroethylene (PTFE), silicon resin, polyethylene (PE), polypropylene (PP), and polyethylene terephthalate (PET), or is formed of a wiper made of an absorbent paper tissue, such as a KIM-WIPES® wiper or a breathable material, e.g., a water-repellant, breathable laminated fabric., such as GORE-TEX® material. KIMWIPES® is a registered trademark of Kimberly-Clark Corporation. GORE-TEX® is a registered trademark of W.L. Gore & Associates.

Also, in accordance with the present invention, the air adjustment layer includes a first metal net is formed by a metal sieve or a porous metal foam through which air can pass. The first metal net is formed such that openings of the first metal net have sizes less than those of the air paths. Also, the first metal net further includes a gas-liquid separation layer which is formed on one entire surface of the first metal net. The gas-liquid separation layer is formed of one or more of, but not limited to polytetrafluoroethylene (PTFE), silicon resin, polyethylene (PE), polypropylene (PP), and polyethylene terephthalate (PET).

Also, in accordance with the present invention, the air adjustment layer further includes a second metal net formed on the lower end of the stack to cover a zone including a region in which the air paths are formed. The second metal net is formed by a metal sieve or a porous metal foam through which air can pass. Further, the second metal net further includes a gas-liquid separation layer which is formed on one entire surface of the second metal net. The gas-liquid separation layer is formed of one or more of, but not limited to polytetrafluoroethylene (PTFE), silicon resin, polyethylene (PE), polypropylene (PP), and polyethylene terephthalate (PET).

Also, in accordance with the present invention, a heat pipe is connected to the first and second metal nets. Besides, the heat pipe includes a plurality of bars, rods or plates which are spaced apart from one another by a predetermined interval in a widthwise direction of the first metal net. In addition, the heat pipe is formed into the shape of a single plate which has a width corresponding to that of the first metal net and a predetermined thickness. Moreover, the heat pipe is formed of copper or aluminum metal. An electrical insulation layer is formed between the heat pipe and the stack.

Also, in accordance with the present invention, the air supply means further includes air adjustment means which is formed on an inner surface of the first duct at a position separated from the blowing means by a predetermined distance, extends in a widthwise direction of the first duct, and projects downwards by a predetermined length. The air adjustment means is formed at a lengthwise middle portion of the first duct second part. Furthermore, the air adjustment means is formed integrally with the first duct by the fact that the upper wall of the first duct protrudes inwards. Also, the air adjustment means is formed by the fact that a separate block is coupled to an inner surface of the upper wall of the second part of the first duct. Further, the air adjustment means is formed to have a semi-circular or triangular sectional shape. Besides, the air adjustment means is formed such that a frontal surface of the air adjustment means, which comes into direct contact with air, defines an obtuse angle with respect to an air flow direction or has the contour of an arc. In addition, the air adjustment means is formed to have a projection length which corresponds to 30%-70% of an inside height of the first duct at a location where the air adjustment means is provided.

Also, in accordance with the present invention, the fuel cell system includes a direct methanol fuel cell system or a polymer electrolyte membrane fuel cell system.

Further, according to another aspect of the present invention, a semi-passive type fuel cell system is provided. The semi-passive type fuel cell system includes a stack in which a plurality of unit cells are laterally stacked with one another. Each unit cell includes a membrane-electrode assembly and bipolar plates located on both sides of the membrane-electrode assembly. The membrane-electrode assembly has an electrolyte membrane, a cathode electrode, and an anode electrode. The cathode electrode is formed on one side of the electrolyte membrane and the anode electrode is formed on the other side of the electrolyte membrane. The semi-passive type fuel cell system also includes means for supplying fuel and means for supplying air. Each of the bipolar plates have air paths which are formed on a surface facing the cathode electrode and extending from an upper end to a lower end of the bipolar plate. The means for supplying air includes ducts which are respectively installed on an upper and a lower end of the stack, a means for blowing air which is installed in a first part of one duct to supply air through the ducts, and a filter which is disposed between the blowing means and an upper end of the stack in one duct. Also, each of the air paths of the bipolar plate is formed in the shape of a straight line which extends from an upper end to a lower end of the stack.

Also, in accordance with the present invention, the ducts include a first duct which is installed on the upper end of the stack and a second duct which is installed on the lower end of the stack; and the means for blowing air is installed to supply air from a first duct first part to a first duct second part. The first duct first part includes the means for blowing air and the first duct second part covers entirely an upper end of the stack. An air suction opening is formed through an upper wall of the first duct first part directly above the means for blowing air. An air supply opening for supplying air to the stack is formed through a lower wall of the first duct second part to have an area corresponding to the area of the upper end of the stack. Further, an upper wall of the first duct second part is inclined downwards to have a predetermined inclination angle so that a height of the upper wall gradually decreases from one end close to the means for blowing air to the other end of the upper wall.

Also, in accordance with the present invention, the filter is formed to have an area which corresponds to a widthwise sectional area of an inside space of the first duct, and is installed in a direction perpendicular to air flow. The filter is installed at a position which corresponds to one end of the stack. Besides, the filter is formed of a porous material through which air can pass. In addition, the filter is formed of one or more of, but not limited to polytetrafluoroethylene (PTFE), silicon resin, polyethylene (PE), polypropylene (PP), and polyethylene terephthalate (PET). Further, the filter is supported by a support plate installed in the first duct. Moreover, an air receiving opening for receiving air having passed through the stack is formed through an upper wall of the second duct to have an area corresponding to that of the lower end of the stack, and an air discharge opening for discharging air to the outside is formed through the other end of the second duct. Furthermore, a lower wall of the second duct is inclined downwards to have a predetermined inclination angle so that a height of the lower wall gradually increases from one end toward the other end of the lower wall. Also, the lower wall of the second duct is inclined at the same inclination angle as the upper wall of the first duct. In the meantime, the upper wall of the first duct second part is formed to have a uniform height. Further, the lower wall of the second duct is formed to have a uniform height.

DETAILED DESCRIPTION

Figure 1:
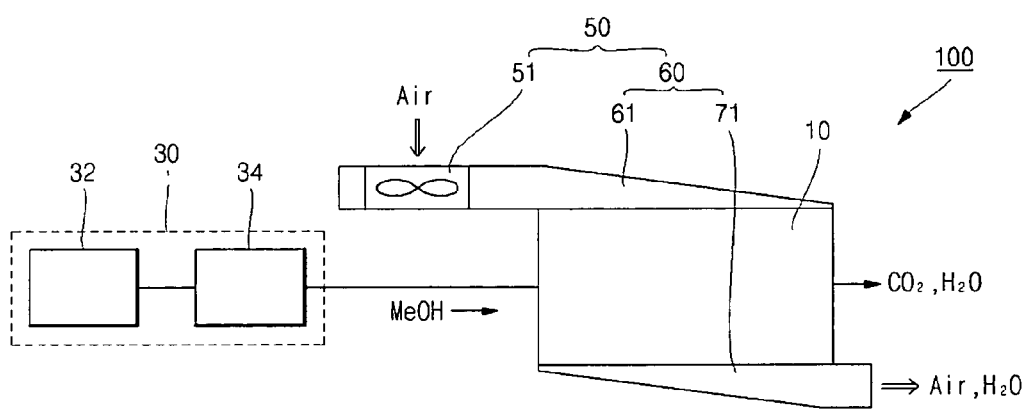
FIG. 1 is a schematic view illustrating the entire construction of a semi-passive type fuel cell system in accordance with a first embodiment of the present invention.
Figure 2:
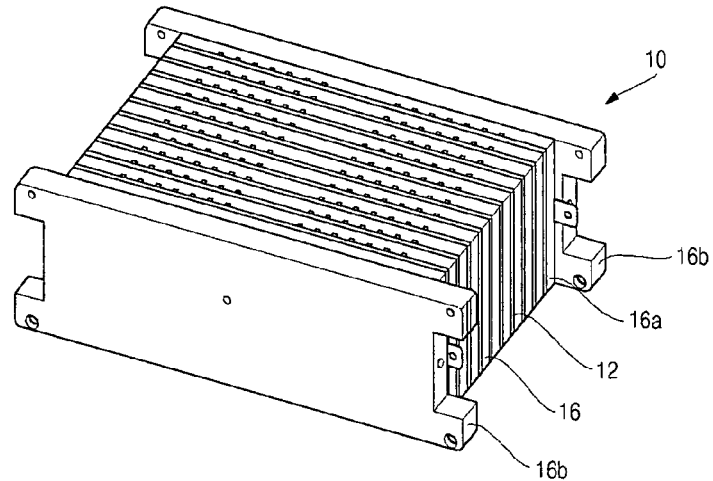
FIG. 2 is a perspective view illustrating the stack of the semi-passive type fuel cell system in accordance with the first embodiment of the present invention.
Figure 3:
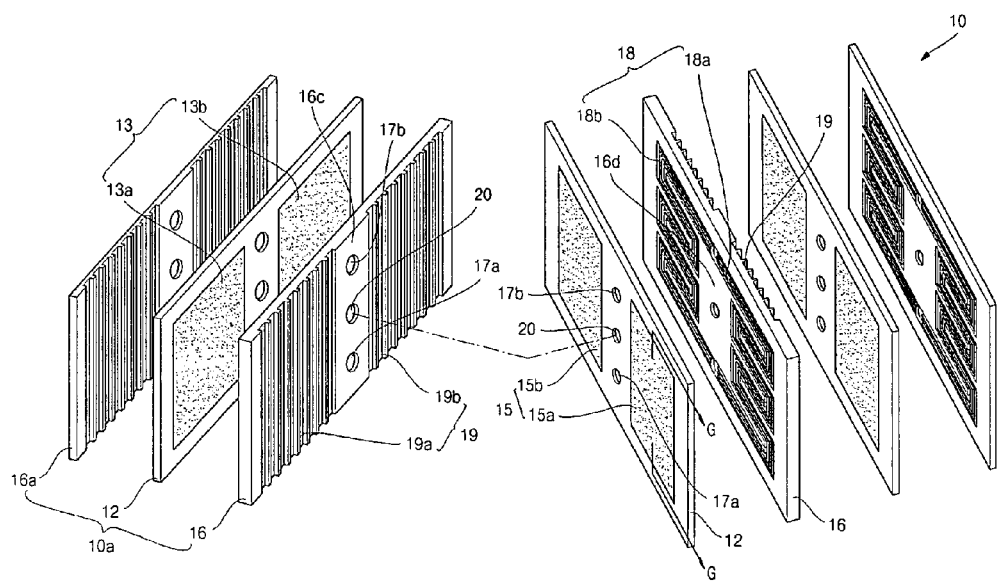
FIG. 3 is an exploded perspective view of the stack shown in FIG. 2.
Figure 3A:
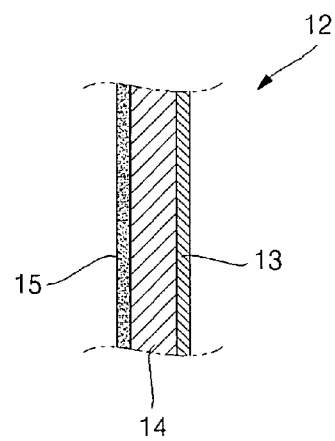
FIG. 3A is a cross-sectional view taken along the line G-G of FIG. 3.
Figure 4:
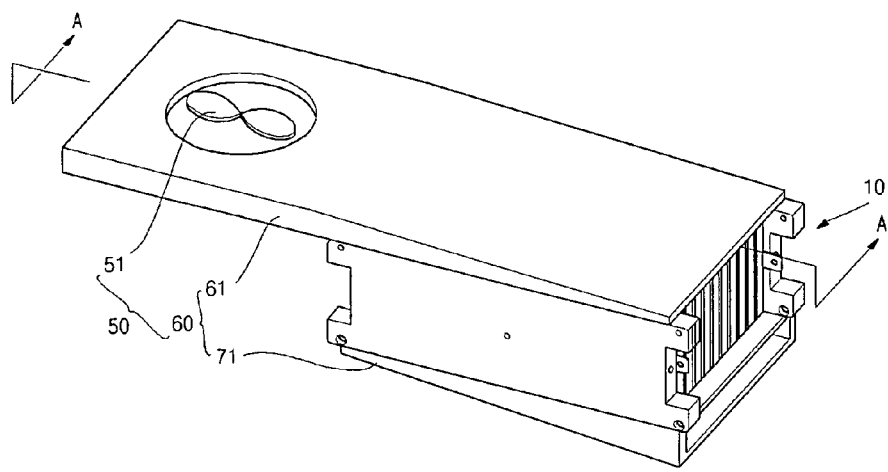
FIG. 4 is a perspective view illustrating the coupling relationship between the stack and blowing means shown in FIG. 1.

Referring to FIGS. 1 through 5, the semi-passive type fuel cell system 100 in accordance with the first embodiment of the present invention includes a stack 10, fuel supply means 30 for supplying a fuel to the stack 10, and air supply means 50 for supplying air to the stack 10. Here, descriptions will be concentrated on a direct methanol fuel cell (DMFC) system which produces electrical energy by directly using methanol as a fuel. Of course, the fuel cell system according to the present invention can be applied to a polymer electrolyte membrane fuel cell (PEMFC) system which produces electrical energy using as a fuel hydrogen generated by reforming a fuel. The PEMFC requires a reformer for reforming a liquid fuel and generating hydrogen.

The stack 10 includes a plurality of unit cells 10a which are laterally stacked with one another. Each unit cell 10a is composed of a membrane-electrode assembly (MEA) 12, and bipolar plates 16 located on both sides of the MEA 12. The bipolar plate 16 is formed such that both surfaces of the bipolar plate 16 are brought into contact with MEAs 12 to be shared by two unit cells 10a. The stack 10 supplies electricity to an external load through end plates 16a which are bipolar plates placed on both widthwise ends of the stack 10. The stack 10 further includes support plates 16b which are coupled to the outer surfaces of the end plates 16a to fasten the bipolar plates 16 and MEAs 12. Each of the support plates 16b is formed with appropriate paths (not shown) therein so that a fuel supplied from the fuel supply means 30 can be transferred to the bipolar plates 16 through the appropriate paths. The end plates 16a can be formed to perform the additional function of the support plates 16b.

The stack 10 is formed with unit cells 10a on the left and right parts thereof when viewed from the vertical center line of the bipolar plate 16. That is, when viewing the stack 10 from the front, independent unit cells 10a are formed on the left and right parts of the stack 10. Further, on the center part between the left and right unit cells 10a, the stack 10 is formed with first and second through-holes 17a, 17b which provide fuel supply paths. Therefore, the stack 10 is laterally supplied with a fuel through the first and second through-holes 17a, 17b. Also, the stack 10 is supplied with air through an air path 19 which is formed in each bipolar plate 16 to extend from the upper end to the lower end of the bipolar plate 16. Hereinbelow, the structures of the MEA 12 and the bipolar plate 16 which constitute the stack 10 will be described in detail. The unit cells 10a which are formed on the left and right parts of the stack 10 when viewed from the vertical center line of the bipolar plate 16 can be integrated with each other. In this case, the first and second through-holes 17a, 17b are formed on both side portions of each bipolar plate 16.

The MEA 12 is formed such that an electrolyte membrane 14 is sandwiched between an anode electrode 13 and a cathode electrode 15. The anode electrode 13 has anode electrodes 13a, 13b which are respectively formed on the left and right parts of one surface of the electrolyte membrane 14 to be spaced apart from each other, and the cathode electrode 15 has cathode electrodes 15a, 15b which are respectively formed on the left and right parts of the other surface of the electrolyte membrane 14 to be spaced apart from each other. Thus, the MEA 12 has non-reaction regions on the center parts of both surfaces thereof, which are not formed with the anode electrode 13 or the cathode electrode 15. The non-reaction regions are formed with the first and second through-holes 17a, 17b which provide fuel supply paths. Between the first and second through-holes 17a, 17b, the MEA 12 can be formed with a locking hole 20 through which a bolt for locking the stack 10 is inserted.

The anode electrode 13 and the cathode electrode 15 have fuel diffusion layers for the supply and diffusion of a fuel, catalyst layers for the oxidation and reduction of the fuel, and electrode supports. The anode electrode 13 separates electrons and hydrogen ions from the supplied fuel, and the electrolyte membrane 14 moves the hydrogen ions to the cathode electrode 15. The cathode electrode 15 causes the electrons and hydrogen ions supplied from the anode electrode 13 to react with oxygen, and produces water. Thus, the stack 10 generates electrical energy through electrochemical reaction between the hydrogen and oxygen.

The bipolar plate 16 is brought into close contact with the MEAs 12 on both surfaces thereof, and is formed with a fuel path 18 and the air path 19 on both surfaces thereof, respectively. When viewed from the vertical center line of the bipolar plate 16, the fuel path 18 is formed on the left and right parts of one surface of the bipolar plate 16, and the air path 19 is formed on the left and right parts of the other surface of the bipolar plate 16. Thus, the bipolar plate 16 has non-formation regions 16c, 16d on the center parts of both surfaces thereof which are not formed with the fuel path 18 or the air path 19. The bipolar plate 16 comes into close contact with the anode electrode 13 of one MEA 12 on one surface thereof and with the cathode electrode 15 of another MEA 12 on the other surface thereof. Therefore, the one surface of the bipolar plate 16 which comes into close contact with the anode electrode 13 is formed with the fuel path 18, so that the fuel can be continuously supplied to the anode electrode 13. Also, the other surface of the bipolar plate 16 which comes into close contact with the cathode electrode 15 is formed with the air path 19, so that air can be continuously supplied to the cathode electrode 15.

First and second through-holes 17a, 17b are formed through the non-formation region 16d of the bipolar plate 16 which is positioned between the left and right parts of the surface of the bipolar plate 16 which is formed with the fuel path 18, such that the first and second through-holes 17a, 17b pass through the bipolar plate 16 and are connected to one end and the other end of the fuel path 18. Hence, in the bipolar plate 16, the fuel supplied through the first through-hole 17a flows through the fuel path 18 and then is discharged through the second through-hole 17b. The first and second through-holes 17a, 17b are formed at the same heights through the bipolar plate 16 and the MEA 12 to properly define a fuel path through the upper and lower parts of the stack 10. Therefore, the stack 10 is supplied with the fuel through the first through-holes 17a from one widthwise end thereof, and the non-reacted part of the fuel and carbon dioxide as a reaction byproduct are discharged through the second through-holes 17b out of the other widthwise end of the stack 10. A locking hole 20 through which a bolt (not shown) for locking the stack 10 is formed through the bipolar plate 16 between the first and second through-holes 17a, 17b. The first and second through-holes 17a, 17b are connected to the fuel supply means 30 through the appropriate paths (not shown) formed in the support plates 16b to allow the fuel to flow. The paths of the support plates 16b can be formed in a variety of ways depending upon the design of the stack 10.

The bipolar plate 16 is formed of a metallic material, for example, a metal such as aluminum, copper and iron and an alloy thereof, or a conductive material such as graphite and a carbon compound.

When viewed from the vertical center line of the bipolar plate 16, the fuel path 18 is formed on the left and right parts of one surface of the bipolar plate 16 which comes into contact with the anode electrode 13 of the MEA 12, to have a predetermined depth and width, that is, a predetermined sectional area. That is, fuel paths 18a, 18b are formed on both sides of the non-formation region 16d which is positioned on the center part of one surface of the bipolar plate 16. The fuel path 18 may be formed in a zigzag pattern to increase the entire area of the fuel path 18. Accordingly, as the area of the fuel path 18 over which the fuel path 18 is brought into contact with the anode electrode 13 of the MEA 12 increases, the area of the anode electrode 13 over which the anode electrode 13 is brought into direct contact with the fuel increases. Because the stack 10 is supplied with the fuel at desired pressure by a fuel pump, even though the fuel path 18 is formed in a zigzag pattern, the fuel can be reliably supplied to the stack 10.

When viewed from the vertical center line of the bipolar plate 16, the air path 19 is formed on the left and right parts of the other surface of the bipolar plate 16 which comes into contact with the cathode electrode 15 of the MEA 12, to have a predetermined depth and a width. That is, air paths 19a, 19b are formed on both sides of the non-formation region 16c which is positioned on the center part of the other surface of the bipolar plate 16. The air path 19 may be formed in the shape of a straight line which extends from the upper end to the lower end of the bipolar plate 16 so that air supplied from above or from below can reliably flow through the air path 19. Unlike the fuel path 18, the air path 19 is not connected with the first and second through-holes 17a, 17b.

The MEA 12 and the bipolar plate 16 may be formed without the non-reaction regions and the non-formation regions on their central parts. In other words, the MEA 12 may not have the non-reaction regions and be entirely formed on one and the other surfaces thereof with the anode electrode 13 and the cathode electrode 15, respectively. Also, the bipolar plate 16 may not have the non-formation regions and be entirely formed on one and the other surfaces thereof with the fuel path 18 and the air path 19, respectively. In this case, in the stack 10, the first and second through-holes 17a, 17b are formed through both side portions of the bipolar plate 16 and the MEA 12.

The fuel supply means 30 includes a fuel tank 32 for storing a fuel diluted to a predetermined concentration and a fuel pump 34 for supplying the fuel to the stack 10. In the case where the fuel tank 32 is structured to mix an original fuel liquid and water, which are separately prepared, and to dilute the original fuel liquid to a predetermined concentration, the fuel supply means 30 may further include an original fuel liquid tank (not shown) for storing the original fuel liquid and an original fuel liquid pump (not shown). The fuel tank 32 may have the shape of a cartridge in which a fuel diluted to a predetermined concentration is stored. If the fuel stored in the fuel tank 32 is exhausted, the fuel can be replenished or a new fuel tank can be mounted.

In the fuel tank 32, there is stored a liquid fuel such as methanol or ethanol which is diluted to a predetermined concentration. The fuel pump 34 is connected to the fuel tank 32 and supplies the fuel received in the fuel tank 32 to the anode electrodes 13 of the stack 10. In the case where the fuel tank 32 receives and then dilutes an original fuel liquid to a predetermined concentration, the fuel tank 32 is connected through a separate piping to the anode electrode 13 and the cathode electrode 15 of the stack 10 such that the non-reacted part of the fuel which is discharged from the anode electrode 13 of the stack 10 and the water discharged from the cathode electrode 15 of the stack 10 can be collected.

The air supply means 50 includes blowing means 51 for sucking and discharging air and a duct 60 for supplying the air emitted from the blowing means 51 to the upper or the lower end of the stack 10.

The blowing means 51 sucks outside air and emits sucked air at constant pressure. The blowing means 51 includes a blower or a fan. Of course, the blowing means 51 may include a variety of other means capable of emitting air at a desired pressure.

The duct 60 includes a first duct 61 which is installed on the upper end of the stack 10 and a second duct 71 which is installed on the lower end of the stack 10. The blowing means 51 is installed inside or outside the first duct 61 or the second duct 71. The duct 60 functions to guide the air emitted from the blowing means 51 to the upper end of the stack 10 and to supply the air through the air path 19. While it is illustrated in this embodiment that the first duct 61 is installed on the upper end of the stack 10 and the second duct 71 is installed on the lower end of the stack 10, it is to be appreciated that the first duct 61 can be installed on the lower end of the stack 10 and the second duct 71 can be installed on the upper end of the stack 10 depending upon the design or the usage of a mobile communication terminal.

The first duct 61 is formed to have a hollow box-shaped configuration. The first duct 61 has a first part inside or outside which the blowing means 51 is arranged and a second part which is placed on the upper end of the stack 10. (Here, when viewed from FIG. 1, the first part of the first duct 61 corresponds to the left part in which the blowing means 51 is arranged and which projects outward from the upper end of the stack 10, and the second part of the first duct 61 corresponds to the right part which is placed on the upper end of the stack 10). The first duct 61 may be formed such that the first part of the first duct 61 has a height which substantially corresponds to that of the blowing means 51 and the blowing means 51 is disposed in the first part of the first duct 61. An air suction opening 62 is formed through the upper wall of the first part of the first duct 61 such that the blowing means 51 can suck air through the air suction opening 62. The air suction opening 62 may have an area which corresponds to the upper area of the blowing means 51. The first part of the first duct 61 is formed to have a uniform height such that sucked air can reliably flow toward the second part of the first duct 61. The one end 61a of the first duct 61 is closed to prevent air sucked by the blowing means 51 from leaking outside. Consequently, the first duct 61 causes the air sucked by the blowing means 51 to be emitted toward the second part of the first duct 61.

The second part of the first duct 61 is formed to have a sectional area corresponding to the area of the upper end of the stack 10 and a predetermined height, such that the second part of the first duct 61 can cover the entire upper end of the stack 10. The lower wall of the second part of the first duct 61 which is to be brought into contact with the upper end of the stack 10 is opened to define an air supply opening 63. The air supply opening 63 may be formed to have a profile and an area which correspond to those of the upper end of the stack 10. Therefore, in the first duct 61, the air sucked through the air suction opening 62 by the blowing means 51 in the first part is guided toward the second part and is supplied to the air paths 19 of the stack 10 through the air supply opening 63.

The second part of the first duct 61 may be formed such that the height of the inside space of the second part of the first duct 61 gradually decreases from one end toward the other end of the stack 1. Namely, the second part of the first duct 61 is formed such that the upper wall 61c of the second part of the first duct 61 is inclined downwards toward the upper end of the stack 10 to have a predetermined inclination angle. Thus, the sectional area of the second part of the first duct 61 gradually decreases as the second part of the first duct 61 faces away from the blowing means 51 to ensure that the velocity of air emitted from the blowing means 51 is not decreased. In general, in the case where the sectional area of a duct is constant, the velocity of air and the amount of supplied air decrease as the air is distant from blowing means. This phenomenon becomes serious as the amount of air emitted from the blowing means decreases. Therefore, the second part of the first duct 61 can be formed to have an appropriate inclination angle of the upper wall 61c depending upon the amount of air emitted from the blowing means 51. That is, if the amount of air emitted from the blowing means 51 increases, the second part of the first duct 61 can be formed to have a smaller inclination angle of the upper wall 61c. On the contrary, if the amount of air emitted from the blowing means 51 decreases, the second part of the first duct 61 can be formed to have a larger inclination angle of the upper wall 61c.

Similarly to the first duct 61, the second duct 71 is formed to have a hollow box-shaped configuration. The second duct 71 is installed on the lower end of the stack 10 to cover the lower end of the stack 10. An air receiving opening 73 is formed through the upper wall of the second duct 71 to have an area corresponding to that of the lower end of the stack 10. One end 71a of the second duct 71 is closed, and the other end 71b of the second duct 71 is opened to define an air discharge opening 72. Accordingly, the second duct 71 functions to discharge air having passed through the stack 10 to the outside.

The lower wall 71c of the second duct 71 is inclined downward to have a predetermined inclination angle so that the height of the inside space of the second duct 71 gradually increases from one end 71a to the other end 71b of the second duct 71. By this fact, the velocity of air introduced into the second duct 71 is relatively faster at one end 71a than the other end 71b so that the air can be smoothly discharged to the outside. The lower wall 71c of the second duct 71 may be inclined to have the same inclination angle as the upper wall 61c of the second part of the first duct 61. As a consequence, the entire fuel cell system has a uniform height, and the height of the entire fuel cell system is not partially increased in spite of the presence of the duct 50. The stack 10 is held while being inclined due to the inclination of the upper wall 61c of the second part of the first duct 61 and the lower wall 71c of the second duct 71.

The second duct 71 provides a drain passage of the water produced by the reaction in the cathode electrodes 15 of the stack 10. In this regard, a separate piping for collecting water can be provided to the other end 71b of the second duct 71.

Figure 5:
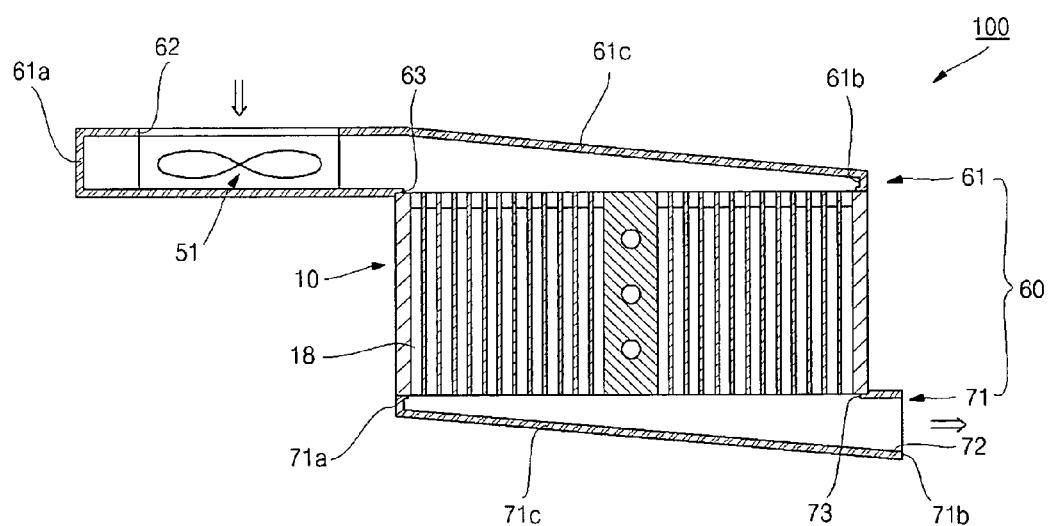
FIG. 5 is a cross-sectional view taken along the line A of FIG. 4.
Figure 6:
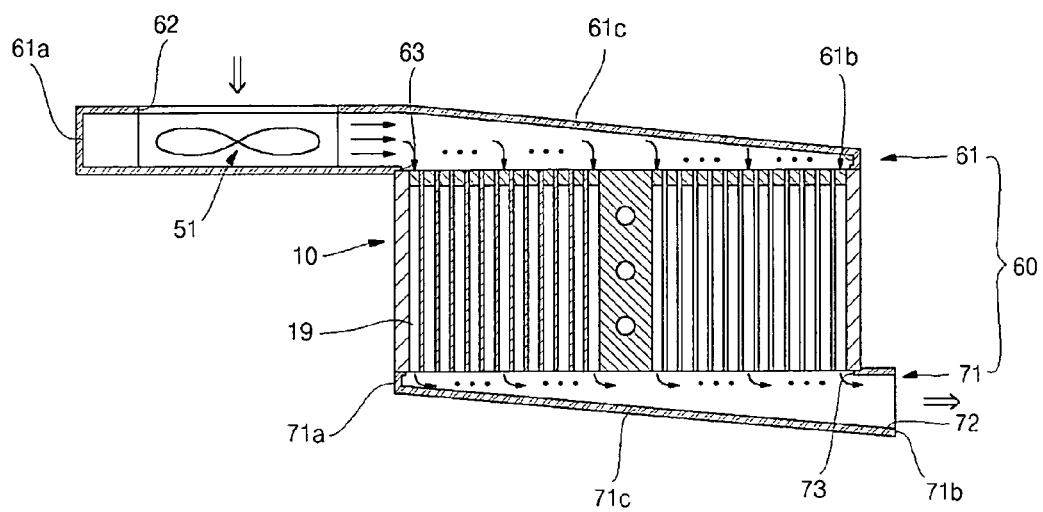
FIG. 6 is a cross-sectional view illustrating air flow through the stack in FIG. 5.

FIG. 6 is a cross-sectional view illustrating air flow through the stack in FIG. 5. Here, explanations will be concentrated on the procedure for supplying air to the stack 10 by the air supply means 50. Because the procedure for supplying a fuel to the stack 10 by the fuel supply means 30 is well known to those skilled in the art, detailed explanations thereof will be omitted.

When viewed from the stack 10, the first duct 61 is coupled to the upper end of the stack 10, and the second duct 71 is coupled to the lower end of the stack 10. The blowing means 51 is disposed in the first part of the first duct 61, and the second part of the first duct 61 is coupled to the upper end of the stack 10. Thus, as the blowing means 51 is operated, the blowing means 51 sucks air downward through the air suction opening 62, and sucked air is emitted from the side of the blowing means 51 toward the second part of the first duct 61. The first duct 61 is structured to allow the air emitted from the blowing means 51 to flow toward the second part of the first duct 61. The upper wall 61c of the second part of the first duct 61 is downwardly inclined to ensure that the velocity of air current and the amount of supplied air are not decreased adjacent to the other end 61b of the first duct 61. Accordingly, below the second part of the first duct 61, the air paths 19 of the bipolar plates 16 are respectively supplied with the constant amount of air irrespective of the distance from the blowing means 51.

The air having passed through the air paths 19 of the bipolar plates 16 flows out of the lower end of the stack 10 and is introduced into the second duct 71 through the air receiving opening 73 of the second duct 71. Due to the fact that the air paths 19 of the bipolar plates 16 are formed in the shape of a straight line extending in a vertical direction, smooth air flow can be ensured. The second duct 71 is coupled to the lower end of the stack 10 and is structured to allow the air introduced therein from the stack 10 to flow toward the other end 71b of the second duct 71. Because the height of the inside space of the second duct 71 gradually increases from one end 71a to the other end 71b, the air introduced into the second duct 71 from the stack 10 can smoothly flow from one end 71a toward the other end 71b. The air flowing from one end 71 a toward the other end 71b is discharged to the outside through the air discharge opening 72, which is formed in the other end 71b of the second duct 71.

Figure 7:
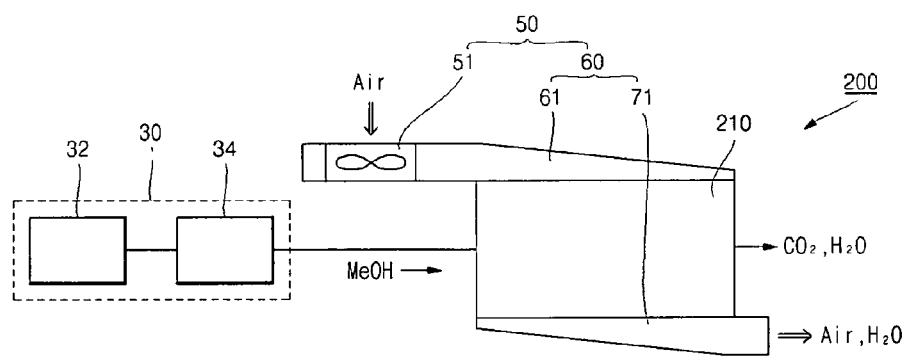
FIG. 7 is a schematic view illustrating the entire construction of a semi-passive type fuel cell system in accordance with a second embodiment of the present invention.
Figure 8:
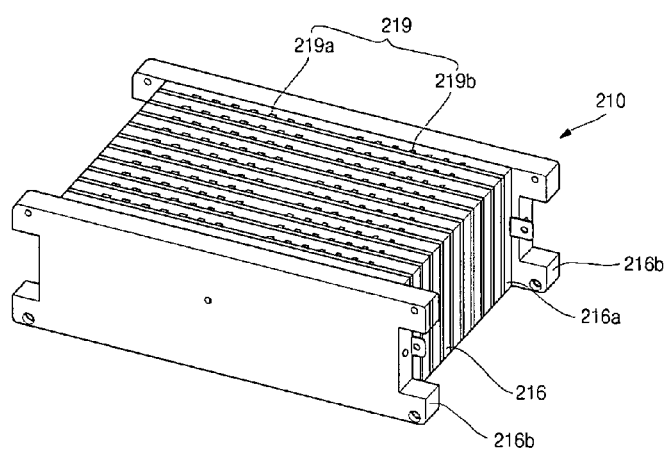
FIG. 8 is a perspective view illustrating the stack of the semi-passive type fuel cell system in accordance with the second embodiment of the present invention.
Figure 9:
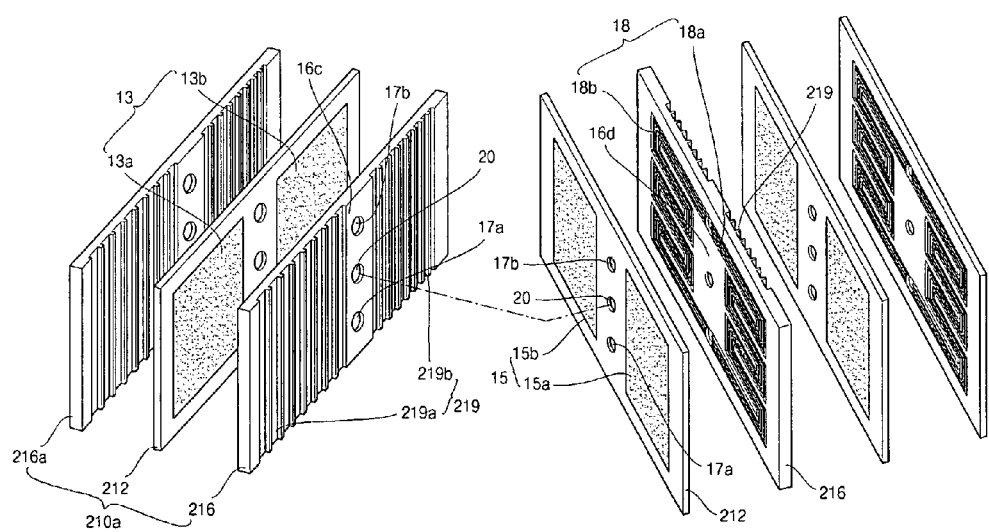
FIG. 9 is an exploded perspective view of the stack shown in FIG. 8.
Figure 10:
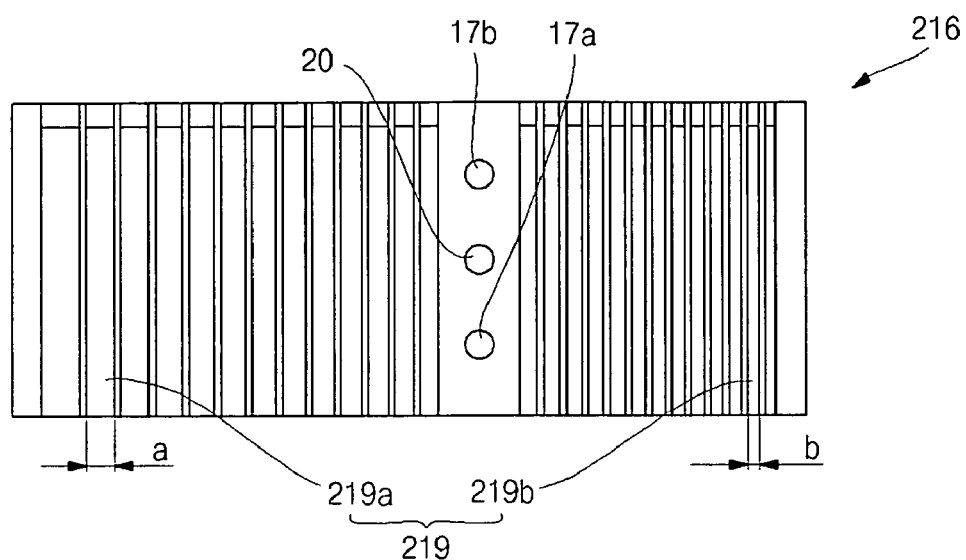
FIG. 10 is a front view illustrating the surface of the bipolar plate shown in FIG. 9 on which air paths are formed.
Figure 11:
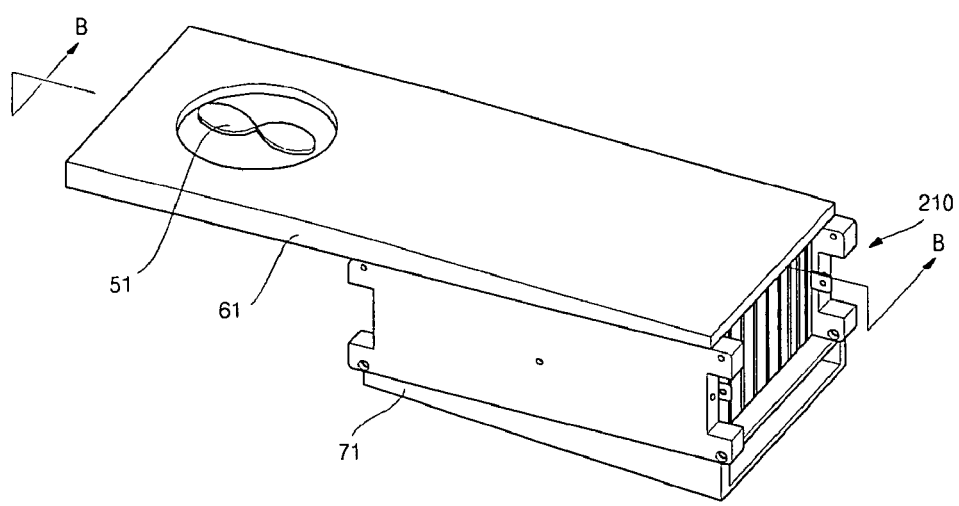
FIG. 11 is a perspective view illustrating the coupling relationship between the stack and blowing means shown in FIG. 7.
Figure 12:
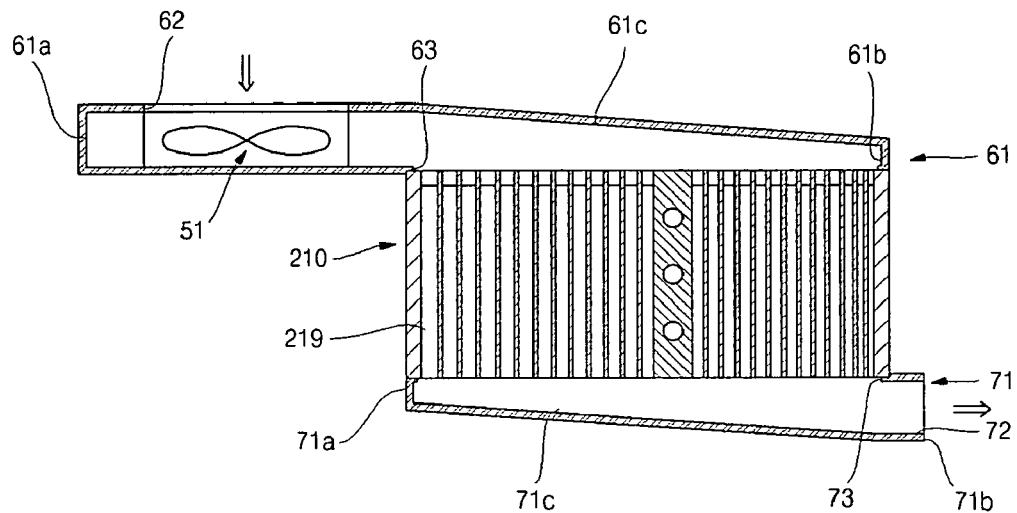
FIG. 12 is a cross-sectional view taken along the line B of FIG. 11.

FIG. 7 is a schematic view illustrating the entire construction of a semi-passive type fuel cell system in accordance with a second embodiment of the present invention. FIG. 8 is a perspective view illustrating the stack of the semi-passive type fuel cell system in accordance with the second embodiment of the present invention. FIG. 9 is an exploded perspective view of the stack shown in FIG. 8. FIG. 10 is a front view illustrating the surface of the bipolar plate shown in FIG. 9 on which air paths are formed. FIG. 11 is a perspective view illustrating the coupling relationship between the stack and blowing means shown in FIG. 7. FIG. 12 is a cross-sectional view taken along the line B of FIG. 11.

Referring to FIGS. 7 through 12, the semi-passive type fuel cell system 200 in accordance with the second embodiment of the present invention includes a stack 210, fuel supply means 30 for supplying a fuel to the stack 210, and air supply means 50 for supplying air to the stack 210. In the following descriptions given for the semi-passive type fuel cell system 200, the component parts which are the same as those of the semi-passive type fuel cell system 100 according to the first embodiment will be referenced by the same reference numerals, and detailed explanations thereof will be omitted.

The stack 210 includes a plurality of unit cells 210a which are laterally stacked with one another. Each unit cell 210a is composed of a membrane-electrode assembly (MEA) 212, and bipolar plates 216 located on both sides of the MEA 212.

The bipolar plate 216 is formed such that both surfaces of the bipolar plate 216 are brought into contact with MEAs 212 to be shared by two unit cells 210a. The stack 210 supplies electricity to an external load through end plates 216a which are bipolar plates placed on both widthwise ends of the stack 210. The stack 210 further includes support plates 216b which are coupled to the outer surfaces of the end plates 216a to fasten the bipolar plates 216 and MEAs 212. Each of the support plates 216b is formed with appropriate paths (not shown) therein so that a fuel supplied from the fuel supply means 30 can be transferred to the bipolar plates 216 through the appropriate paths. The end plates 216a can be formed to perform the additional function of the support plates 216b.

The stack 210 is formed with unit cells 210a on the left and right parts thereof when viewed from the vertical center line of the bipolar plate 216. That is, when viewing the stack 210 from the front, independent unit cells 210a are formed on the left and right parts of the stack 210. Further, on the center part between the left and right unit cells 210a, the stack 210 is formed with first and second through-holes 17a, 17b which provide fuel supply paths. Therefore, the stack 210 is laterally supplied with a fuel through the first and second through-holes 17a, 17b. Also, the stack 210 is supplied with air through an air path 219 which is formed in each bipolar plate 216 to extend from the upper end to the lower end of the bipolar plate 216. The unit cells 210a which are formed on the left and right parts of the stack 210 when viewed from the vertical center line of the bipolar plate 216 can be integrated with each other. In this case, the first and second through-holes 17a, 17b are formed on both side portions of each bipolar plate 216.

The bipolar plate 216 is brought into close contact with the MEAs 212 on both surfaces thereof, and is formed with a fuel path 18 and the air path 219 on both surfaces thereof, respectively. When viewed from the vertical center line of the bipolar plate 216, the fuel path 18 is formed on the left and right parts of one surface of the bipolar plate 216, and the air path 219 is formed on the left and right parts of the other surface of the bipolar plate 216. Thus, the bipolar plate 216 has non-formation regions 16c, 16d on the center parts of both surfaces thereof which are not formed with the fuel path 18 or the air path 219. The bipolar plate 216 comes into close contact with the anode electrode 13 of one MEA 212 on one surface thereof and with the cathode electrode 15 of another MEA 212 on the other surface thereof. Therefore, the one surface of the bipolar plate 216 which comes into close contact with the anode electrode 13 is formed with the fuel path 18, so that the fuel can be continuously supplied to the anode electrode 13. Also, the other surface of the bipolar plate 216 which comes into close contact with the cathode electrode 15 is formed with the air path 219, so that air can be continuously supplied to the cathode electrode 15.

When viewed from the vertical center line of the bipolar plate 216, air paths 219a, 219b are formed on the left and right parts of the other surface of the bipolar plate 216 which comes into contact with the cathode electrode 15 of the MEA 212, to have a predetermined depth, width and sectional shape. That is, air paths 219a, 219b are formed on both sides of the non-formation region 16c which is positioned on the center part of the other surface of the bipolar plate 216. The air path 219 may be formed in the shape of a straight line which extends from the upper end to the lower end of the bipolar plate 216 so that air supplied from above or from below can reliably flow through the air path 219. Unlike the fuel path 18, the air path 219 is not connected with the first and second through-holes 17a, 17b.

The air path 219 is formed such that the widths 'a' or the depths of the air paths 219a formed on a first part of the bipolar plate 216 which faces the blowing means 51 are greater than the widths 'b' or the depths of the air paths 219b formed on a second part of the bipolar plate 216. That is, the air path 219 is formed such that the sectional areas of the air paths 219a formed on the first part of the bipolar plate 216 are greater than those of the air paths 219b formed on the second part of the bipolar plate 216. As a result, the air path 219 is formed such that the sectional areas of the air paths 219a, 219b gradually decrease from the first part toward the second part of the bipolar plate 216.

As will be described below, the second part of the first duct 61 is formed such that the upper wall 61c of the second part of the first duct 61 is inclined downwards toward the upper end of the stack 210 to have a predetermined inclination angle. Accordingly, the velocity of air emitted from the blowing means 51 does not decrease adjacent to the other end 61b of the first duct 61. Because the other end 61b of the first duct 61 has a relatively small sectional area and is closed, air pressure increases, and the amount of air supplied to the air path 219b is increased. In this regard, because the bipolar plate 216 is formed such that the sectional areas of the air paths 219b formed on the second part of the bipolar plate 216 are less than those of the air paths 219a formed on the first part of the bipolar plate 216, the amounts of air supplied to the air paths 219b are decreased. The degree to which the sectional areas of the air paths 219a, 219b gradually decrease from the first part toward the second part of the bipolar plate 216 is appropriately determined in consideration of the capacity of the blowing means 51, the maximum height of the first duct 61, and the inclination angle of the upper wall 61c of the first duct 61. Hence, the degree of decrease in the sectional area of the air path 219 is not particularly set herein. However, the degree of decrease in the sectional area of the air path 219 can be easily determined through numerical analysis performed by a computer as will be described later.

The MEA 212 and the bipolar plate 216 may be formed without the non-reaction regions and the non-formation regions on their center parts. In other words, the MEA 212 may not have the non-reaction regions and be entirely formed on one and the other surfaces thereof with the anode electrode 13 and the cathode electrode 15, respectively. Also, the bipolar plate 216 may not have the non-formation regions and be entirely formed on one and the other surfaces thereof with the fuel path 18 and the air path 219, respectively. In this case, in the stack 210, the first and second through-holes 17a, 17b are formed through both side portions of the bipolar plate 216 and the MEA 212.

Figure 13:
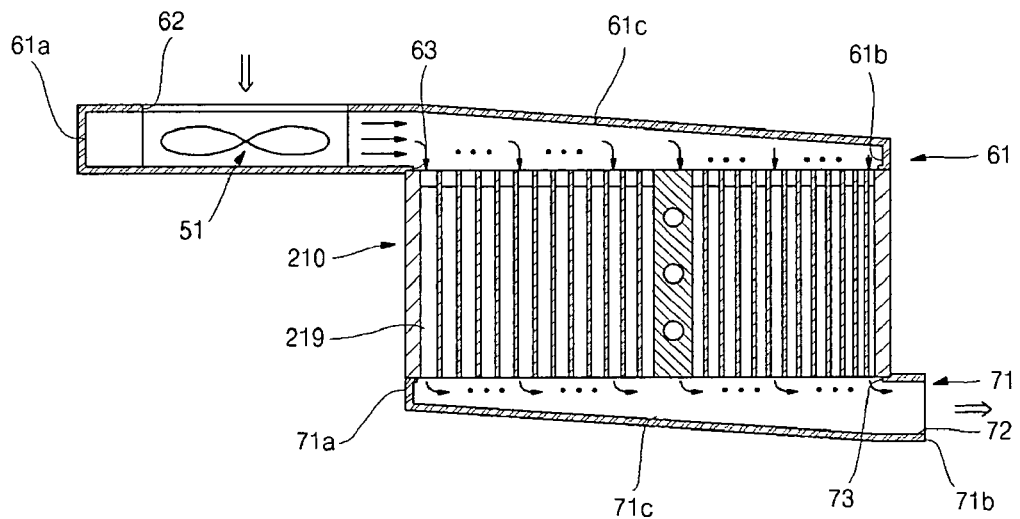
FIG. 13 is a cross-sectional view illustrating air flow through the stack in FIG. 12.
Figure 14:
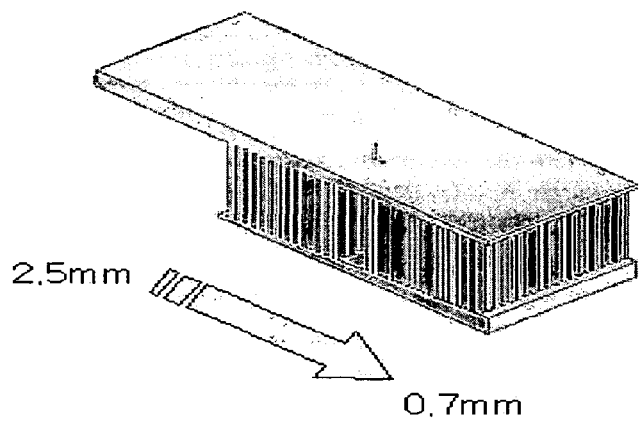
FIG. 14 is a computer graphic of the semi-passive type fuel cell system in accordance with the second embodiment of the present invention, which is used for simulating the velocity of air current in accordance with the size of the air path.
Figure 15:
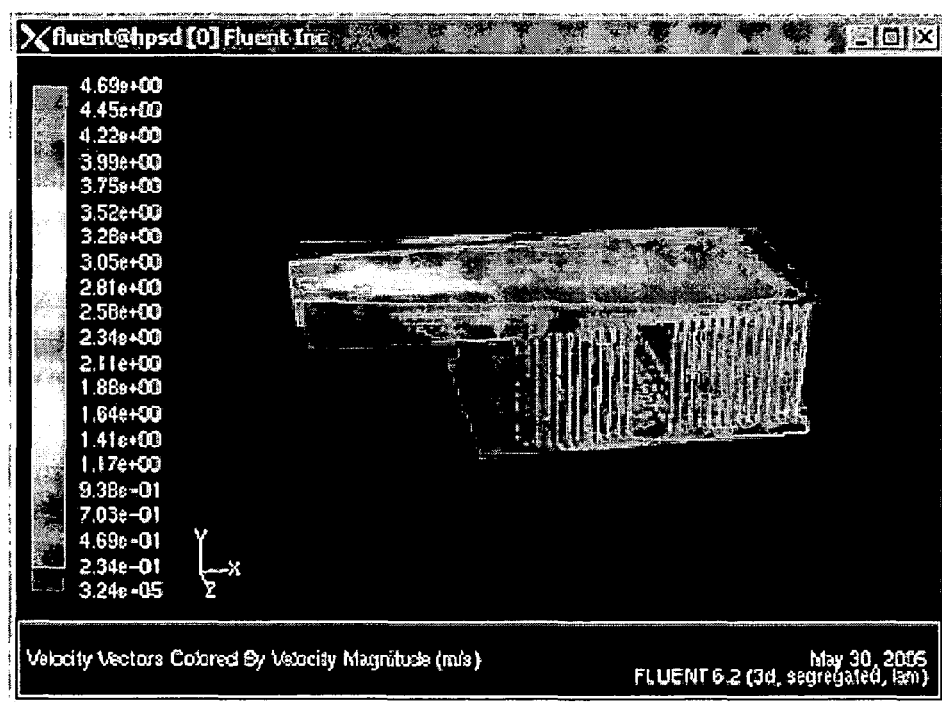
FIG. 15 is a computer graphic illustrating the simulation result for the velocities of air current through respective air paths, which is obtained through implementing numerical analysis.

FIG. 13 is a cross-sectional view illustrating air flow through the stack in FIG. 12. FIG. 14 is a computer graphic of the semi-passive type fuel cell system in accordance with the second embodiment of the present invention, which is used for simulating the velocity of air current depending upon the size of the air path. FIG. 15 is a computer graphic illustrating the simulation result for the velocities of air current through respective air paths, which is obtained through implementing numerical analysis. Here, explanations will be concentrated on the procedure for supplying air to the stack 210 by the air supply means 50. Because the procedure for supplying a fuel to the stack 210 by the fuel supply means 30 is well known to those skilled in the art, detailed explanations thereof will be omitted.

When viewed from the stack 210, the first duct 61 is coupled to the upper end of the stack 210, and the second duct 71 is coupled to the lower end of the stack 210. The blowing means 51 is disposed in a first part of the first duct 61, and a second part of the first duct 61 is coupled to the upper end of the stack 210. Thus, as the blowing means 51 is operated, the blowing means 51 sucks air downward through the air suction opening 62, and sucked air is emitted from the side of the blowing means 51 toward the second part of the first duct 61. The first duct 61 is structured to allow the air emitted from the blowing means 51 to flow toward the second part of the first duct 61. The upper wall 61c of the second part of the first duct 61 is downwardly inclined to ensure that the velocity of air current and the amount of supplied air are not decreased and air pressure is increased adjacent to the other end 61b of the first duct 61. The air paths 219a, 219b of the bipolar plate 216 are formed such that the sectional areas of the air paths 219a, 219b decrease as the air paths 219a, 219b face away from the blowing means 51. Accordingly, although the pressure of supplied air gradually increases toward the other end 61b of the first duct 61, because the sectional areas of the air paths 219a, 219b gradually decrease, the amounts of air introduced into the air paths 219a, 219b are relatively decreased. As a result, each of the air paths 219a, 219b which are formed in the first and the second parts of the bipolar plate 216, respectively, is supplied with a constant amount of air.

As can be readily seen from FIG. 14, the semi-passive type fuel cell system 200 is formed such that the air path 219a formed in one end of the bipolar plate 216 has a width of 2.55 mm, the air path 219b formed in the other end of the bipolar plate 216 has a width of 0.7 mm, and the widths of the air paths 219a, 219b formed therebetween gradually decrease from the one end toward the other end. In this case, referring to FIG. 15 illustrating the result of the numeral analysis performed by the computer, the velocities of air introduced into the respective air paths 219a, 219b of the bipolar plate 216 gradually decrease from the one end toward the other end of the bipolar plate 216. In other words, in the case where the sectional areas of the air paths 219a, 219b of the bipolar plates 216 gradually decrease as in this embodiment of the present invention, air flow resistances in the air paths 219a, 219b gradually increase, and the velocities and amounts of air current in the air paths 219a, 219b are gradually decreased. It was found that a deviation in the air current velocities through the air paths 219a, 219b formed from the one end to the other end of the bipolar plate 216 is decreased to no greater than 0.20. Also, while not shown in a drawing, in the case where the air paths of the bipolar plate are formed to have the same sectional area, it was found that a deviation in the air current velocities is increased to no less than 0.35.

The air having passed through the first duct 61 flows out of the lower end of the stack 210 and is introduced into the second duct 71 through the air receiving opening 73 of the second duct 71. Due to the fact that the air paths 219 of the bipolar plates 216 are formed in the shape of a straight line extending in a vertical direction, smooth air flow can be ensured. The second duct 71 is coupled to the lower end of the stack 210 and is structured to allow the air introduced therein from the stack 210 to flow toward the other end 71b of the second duct 71. Because the height of the inside space of the second duct 71 gradually increases from one end 71a to the other end 71b of the second duct 71, the air introduced into the second duct 71 from the stack 210 can smoothly flow from one end 71a toward the other end 71b. The air flowing from one end 71 a toward the other end 71b is discharged to the outside through the air discharge opening 72 which is formed through the other end 71b of the second duct 71.

Figure 16:
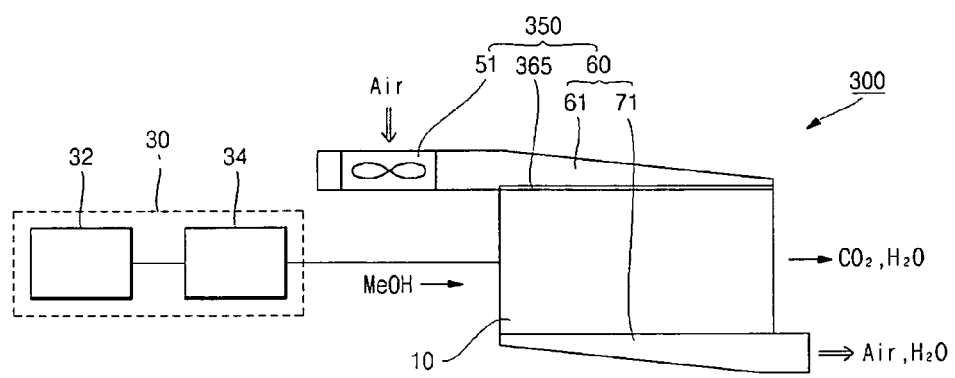
FIG. 16 is a schematic view illustrating the entire construction of a semi-passive type fuel cell system in accordance with a third embodiment of the present invention.
Figure 17:
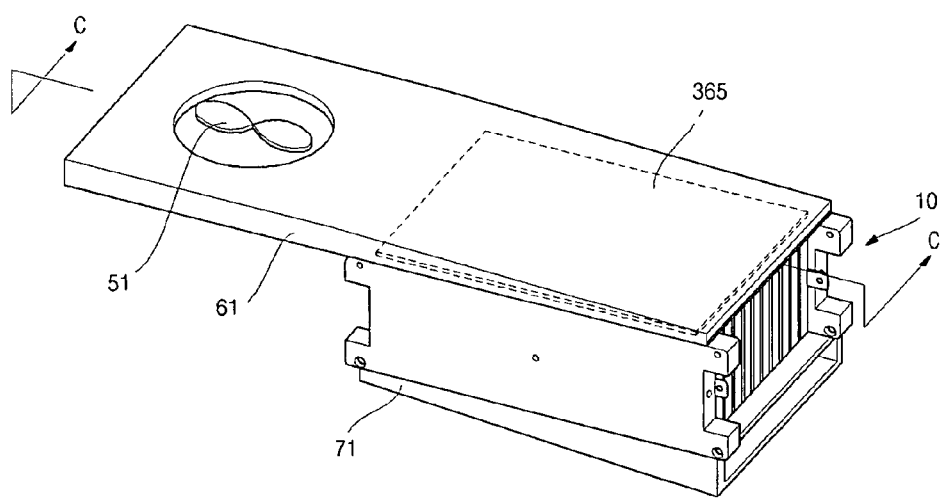
FIG. 17 is a perspective view illustrating the coupling relationship among the stack, the blowing means and the air adjustment layer shown in FIG. 16.
Figure 18:
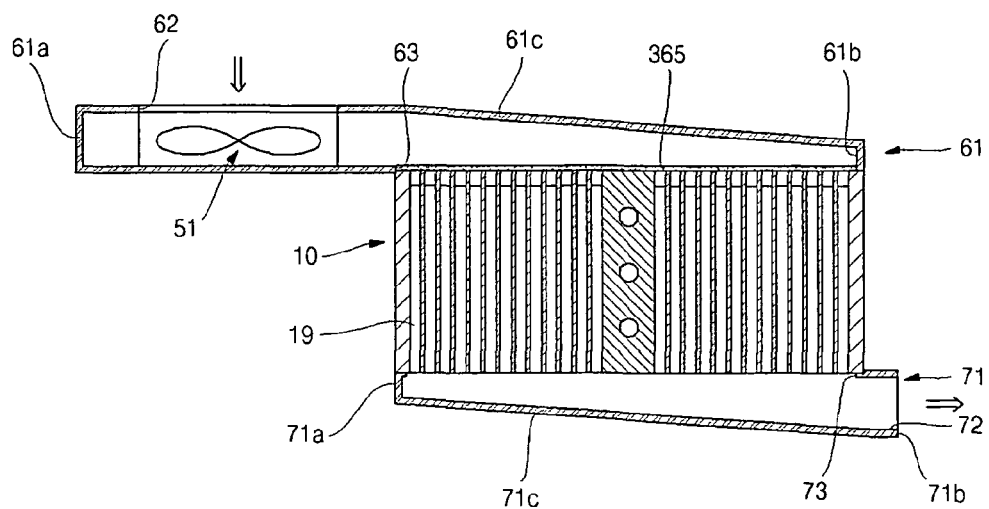
FIG. 18 is a cross-sectional view taken along the line C of FIG. 17.

FIG. 16 is a schematic view illustrating the entire construction of a semi-passive type fuel cell system in accordance with a third embodiment of the present invention. FIG. 17 is a perspective view illustrating the coupling relationship among the stack, the blowing means and the air adjustment layer shown in FIG. 16. FIG. 18 is a cross-sectional view taken along the line C of FIG. 17.

Referring to FIGS. 16 through 18, the semi-passive type fuel cell system 300 in accordance with the third embodiment of the present invention includes a stack 10, fuel supply means 30 for supplying a fuel to the stack 10, and air supply means 350 for supplying air to the stack 10. In the following descriptions given for the semi-passive type fuel cell system 300, the component parts which are the same as those of the semi-passive type fuel cell system 100 according to the first embodiment will be referenced by the same reference numerals, and detailed explanations thereof will be omitted.

The air supply means 350 includes blowing means 51 for sucking and discharging air, a duct 60 for supplying the air emitted from the blowing means 51 to the upper or the lower end of the stack 10, and an air adjustment layer 365 formed on the upper end of the stack 10 to cover a zone including a region in which the air paths 19 are formed.

The air adjustment layer 365 is formed of a porous material such as sponge, through which air can pass. The air adjustment layer 365 is formed to cover the entire upper ends of the air paths 19 and functions to decrease the pressure of air supplied and to entirely uniformize the pressure of air supplied. The air adjustment layer 365 is formed of a porous material having pores which have sectional areas less than those of the air paths 19.

The air adjustment layer 365 can be formed as a gas-liquid separation layer which permits the passage of gas such as air but does not permit the passage of liquid. The gas-liquid separation layer can be formed of one selected from the group consisting of polytetrafluoroethylene (PTFE), and a hydrophobic membrane including silicon resin. Also, the air adjustment layer 365 can be formed of one or more of, but not limited to polyethylene (PE), polypropylene (PP), and polyethylene terephthalate (PET). Here, the material of the gas-liquid separation layer is not limited to particular ones, and instead, a diversity of resinous materials having a hydrophobic property can be used to form the gas-liquid separation layer.

Further, the air adjustment layer 365 can be formed of a material such as that of KIMWIPES® wipers and GORE-TEX® breathable material. Here, KIMWIPES ® wipers have a low noise generation level and are formed along with a poly protection window for minimizing environmental pollution within a testing room. Also, GORE-TEX® breathable material is formed as a very thin layer having a very large number of pores by stretching and heating TEFLON® resin (e.g., non-stick coating material), which has resistance to heat and chemicals, yet has a pore size of $^{2}/_{10,000}$mm to permit passage of air and not permit passage of moisture. TEFLON® is a registered trademark of DuPont. The air adjustment layer 365 can have a single-layered or a multi-layered structure. In the event that the air adjustment layer 365 has a multi-layered structure, a plurality of polymer layers formed of the same material or different materials can be laminated with one another.

The air adjustment layer 365 is formed on the upper end of the stack 10 to cover the zone including the region in which the air paths 19 of the bipolar plates 16 are formed. The air adjustment layer 365 may be formed to cover the entire upper end of the stack 10 in the first duct 61. Hence, the air adjustment layer 365 is coupled in the air supply opening 63 formed in the lower wall of the first duct 61 to cover the entire air supply opening 63.

The air adjustment layer 365 functions to entirely cover the upper ends of the air paths 19 and permit the passage of air with the pressure of air emitted from the blowing means 51 uniformized. Air supplied to the upper ends of the air paths 19 has different pressures depending upon the distance from the blowing means 51 and the configuration of the first duct 61. The air adjustment layer 365 decreases a pressure difference in air supplied to the air paths 19. In particular, the air adjustment layer 365 decreases a pressure difference in air along the lengthwise direction of the first duct 61. Hence, air supplied to the air paths 19 has constant pressure irrespective of a position along the lengthwise direction of the first duct 61. The air having passed through the air adjustment layer 365 passes through the air paths 19 while having constant pressure.

The air adjustment layer 365 is formed to have a predetermined air permeability. In other words, the air adjustment layer 365 is formed to have appropriate air permeability in consideration of the pressure of air emitted from the blowing means, the air pressure needed to supply air to the air paths 19 of the bipolar plates 16, and the amount of air current. The air permeability of the air adjustment layer 365 is determined depending upon the material of the air adjustment layer 365, and the average size and the number of the pores formed in the air adjustment layer 365.

Figure 19:
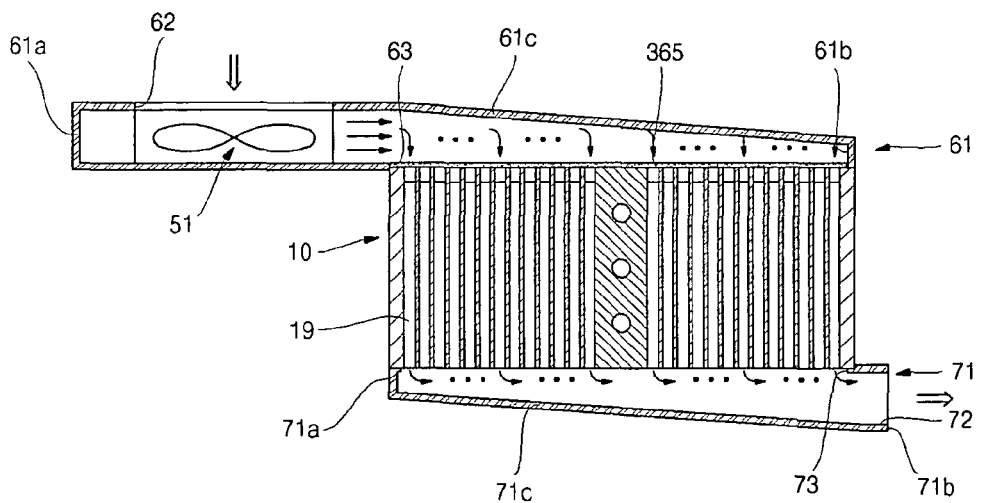
FIG. 19 is a cross-sectional view illustrating air flow through the stack in FIG. 18.
Figure 20:
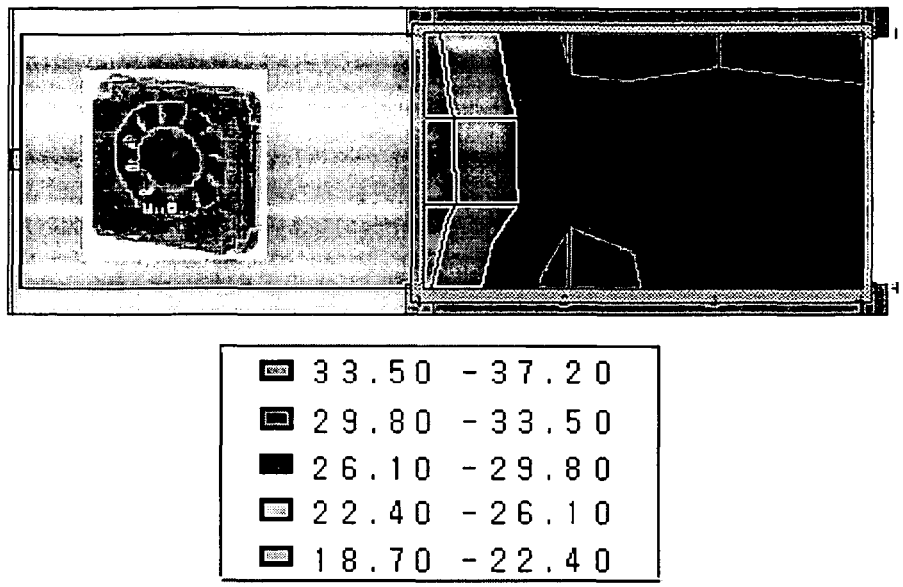
FIG. 20 is a computer graphic illustrating a distribution of air current velocities in the stack shown in FIG. 16.

FIG. 19 is a cross-sectional view illustrating air flow through the stack in FIG. 18. FIG. 20 is a computer graphic illustrating a distribution of air current velocities in the stack shown in FIG. 16. Here, explanations will be concentrated on the procedure for supplying air to the stack 10 by the air supply means 350. Because the procedure for supplying a fuel to the stack 10 by the fuel supply means 30 is well known to those skilled in the art, detailed explanations thereof will be omitted.

As the blowing means 51 disposed in the duct 60 is operated, the blowing means 51 sucks air downward through the air suction opening 62, and sucked air is emitted from the side of the blowing means 51 toward the second part of the first duct 61. The first duct 61 is structured to allow the air emitted from the blowing means 51 to flow toward the second part of the first duct 61. The upper wall 61c of the second part of the first duct 61 is downwardly inclined to ensure that the velocity of air current is not decreased adjacent to the other end 61b of the first duct 61. The air adjustment layer 365 entirely decreases and uniformizes the pressure of air supplied to the air paths 19. Air having passed through the air adjustment layer 365 has constant pressure and is supplied to the air paths 19. Therefore, air supplied to the air paths 19 passes through the respective air paths 19 with the same velocity, whereby the air flow is uniformized. That is, as can be readily seen from FIG. 19, in the stack 10, the velocity of air supplied to the air paths 19 in lengthwise and widthwise directions is uniformized, and the amounts of air introduced into the air paths 19 are uniformized. The velocity distribution (brightness distribution) of air as shown in FIG. 20 represents the results obtained by measuring the velocities of air having passed through the air paths 19 at the lower ends of the air paths 19. Because the amount of air supplied to the air paths 19 is proportional to the product of the velocity of air and the sectional area of the corresponding air path 19, by measuring the velocities of air, it is possible to calculate the amounts of air having passed through the air paths 19. When numerically analyzed, in the case of installing the air adjustment layer 365, a velocity deviation of air by positions, which is measured at the lower end of the stack 10, was 4 cm/s, which is very low. When the air adjustment layer 365 was not installed, a velocity deviation of air by positions was 30 cm/s.

The air having passed through the first duct 61 flows out of the lower end of the stack 10 and is introduced into the second duct 71 through the air receiving opening 73 of the second duct 71. Due to the fact that the air paths 19 of the bipolar plates 16 are formed in the shape of a straight line extending in a vertical direction, smooth air flow can be ensured. The second duct 71 is coupled to the lower end of the stack 10 and is structured to allow the air introduced therein from the stack 10 to flow toward the other end 71b of the second duct 71. Because the height of the inside space of the second duct 71 gradually increases from one end 71a to the other end 71b of the second duct 71, the air introduced into the second duct 71 from the stack 10 can smoothly flow from one end 71a toward the other end 71b. The air flowing from one end 71a toward the other end 71b is discharged to the outside through the air discharge opening 72 which is formed through the other end 71b of the second duct 71.

Figure 21:
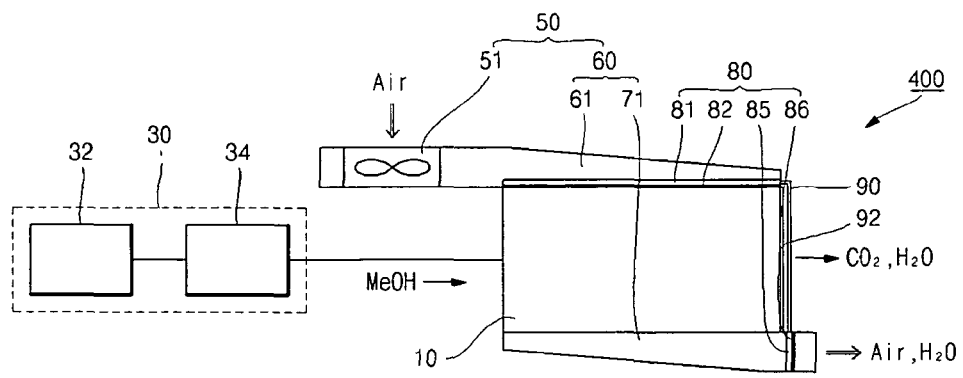
FIG. 21 is a schematic view illustrating the entire construction of a semi-passive type fuel cell system in accordance with a fourth embodiment of the present invention.
Figure 22:
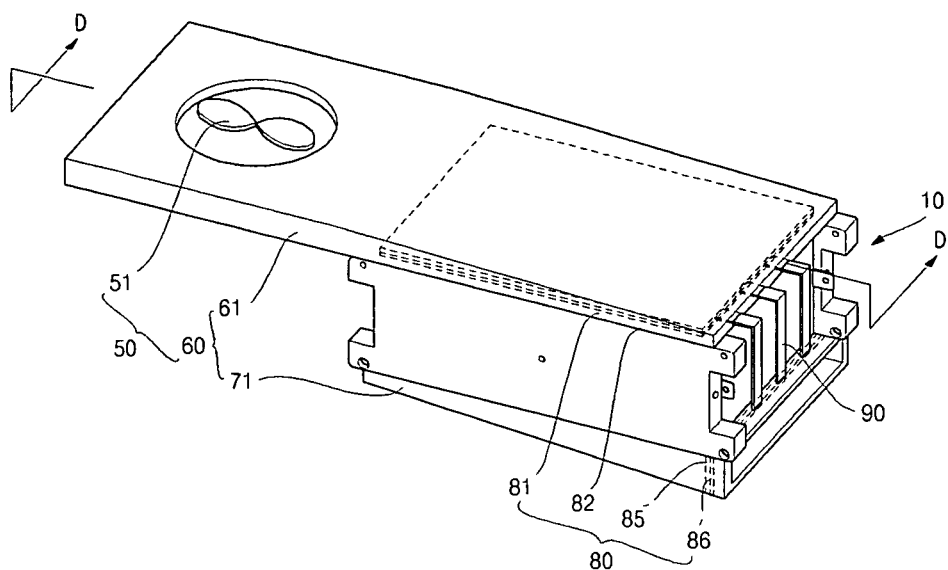
FIG. 22 is a perspective view illustrating the coupling relationship between the stack and the air adjustment layer shown in FIG. 21.
Figure 23:
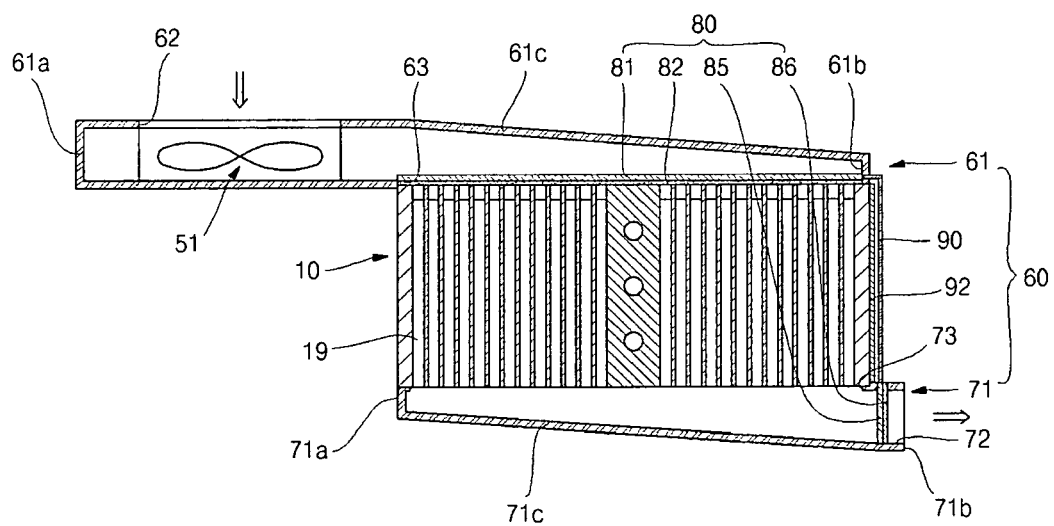
FIG. 23 is a cross-sectional view taken along the line D of FIG. 22.
Figure 24:
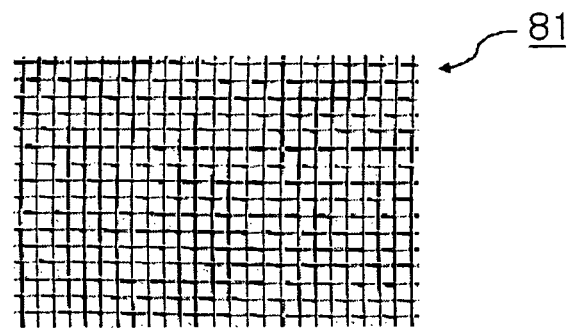
FIG. 24 is an enlarged perspective view illustrating a first metal net used in the semi-passive type fuel cell system in accordance with the fourth embodiment of the present invention.

FIG. 21 is a schematic view illustrating the entire construction of a semi-passive type fuel cell system in accordance with a fourth embodiment of the present invention. FIG. 22 is a perspective view illustrating the coupling relationship between the stack and the air adjustment layer shown in FIG. 21. FIG. 23 is a cross-sectional view taken along the line D of FIG. 22. FIG. 24 is an enlarged perspective view illustrating a first metal net used in the semi-passive type fuel cell system in accordance with the fourth embodiment of the present invention.

Referring to FIGS. 21 through 24, the semi-passive type fuel cell system 400 in accordance with the fourth embodiment of the present invention includes a stack 10, fuel supply means 30 for supplying a fuel to the stack 10, air supply means 350 for supplying air having constant pressure to the stack 10, and an air adjustment layer 80. Also, the semi-passive type fuel cell system 400 may further include a heat pipe 90. In the following descriptions given for the semi-passive type fuel cell system 400, the component parts which are the same as those of the semi-passive type fuel cell system 100 according to the first embodiment will be referenced by the same reference numerals, and detailed explanations thereof will be omitted.

The air adjustment layer 80 includes a first metal net 81 installed in the zone including the region in which the air paths 19 are formed, on the upper end of the stack 10. The air adjustment layer 80 may further include a second metal net 85 installed in a predetermined region in the air discharge opening 72 serving as the exit of the second duct 71, on the lower end of the stack 10. The air adjustment layer 80 may further include gas-liquid separation layers 82, 86 each of which is formed on one surface of each of the first and second metal nets 81, 85.

The air adjustment layer 80 is formed as a metal sieve or a porous metal foam through which air can pass. The metal sieve is a kind of meshed net which is formed by metal wires to have a plurality of openings of a predetermined size. In the metal sieve, while the opening may be formed to have a square shape, it is not necessarily required to define a square opening. In the metal sieve, the size of the opening is generally determined by a unit called a mesh. The mesh is a unit which designates the number of openings existing in one square inch. Also, the size of the metal sieve can be designated by the length of the opening between two metal wires, which is expressed in inches, millimeters, etc. The definition of the mesh which designates the size of the metal sieve slightly varies from country to country or from company to company. For example, in a US standard, a metal sieve having a mesh number of 100 has an opening size of 149 microns and a metal wire diameter of 100 microns. Also, a metal sieve having a mesh number of 5 has an opening size of 4,000 microns and a metal wire diameter of 1,370 microns. The metal sieve may have no standard size designated by meshes and can be formed of a metal wire having a determined diameter to have a predetermined opening size.

The first metal net 81 is formed on the upper end of the stack 10 to cover the zone including the region in which the air paths 19 of the bipolar plates 16 are formed. The first metal net 81 may be formed to cover the entire upper end of the stack 10 in the first duct 61. Hence, the first metal net 81 is coupled in the air supply opening 63 formed in the lower wall of the first duct 61 to cover the entire air supply opening 63. Air supplied to the upper ends of the air paths 19 has different pressures depending upon the distance from the blowing means 51 and the configuration of the first duct 61. The first metal net 81 increases pressure resistance to the air supplied to the air paths 19 and decreases a pressure difference in the air supplied to the air paths 19. In particular, the first metal net 81 decreases a pressure difference in air along the lengthwise direction of the first duct 61. Hence, air supplied to the air paths 19 has constant pressure irrespective of a position along the lengthwise direction of the first duct 61.

The first metal net 81 is formed such that the openings or the pores of the first metal net 81 have sizes less than those of the air paths 19. The first metal net 81 is formed to have predetermined air permeability. The first metal net 81 is formed to have appropriate air permeability in consideration of the pressure of air emitted from the blowing means, the air pressure needed to supply air to the air paths 19 of the bipolar plates 16, and the amount of air current.

The second metal net 85 is formed of a metal sieve or a porous metal foam as in the case of the first metal net 81, and occupies the entire air discharge opening 72 of the second duct 71. The second metal net 85 may be installed perpendicular to the air discharge opening 72. The second metal net 85 temporarily retards the discharge of air through the air discharge opening 72 and increases resistance to air flow in the second duct 71. Accordingly, as the air flows through the air paths 19, air flow resistance increases at the lower ends of the air paths 19, as a result of which the air can flow at a constant velocity in the air paths 19. The second metal net 85 can be formed such that the size of its opening is greater than that of the opening of the first metal net 81. If the size of the opening of the second metal net 85 is excessively small, air flow resistance increases at the lower ends of the air paths 19, and air may not be reliably supplied to the air paths 19.

Each of the gas-liquid separation layers 82, 86 is formed on one surface of each of the first and second metal nets 81, 85. The gas-liquid separation layers 82, 86 can be formed as hydrophobic layers which permit the passage of gas such as air but do not permit the passage of liquid. The gas-liquid separation layers 82, 86 can be formed of one selected from the group consisting of polytetrafluoroethylene (PTFE), and a hydrophobic membrane including silicon resin. Also, the gas-liquid separation layers 82, 86 can be formed of one or more of, but not limited to polyethylene (PE), polypropylene (PP), and polyethylene terephthalate (PET). Here, the material of the gas-liquid separation layer is not limited to particular ones, and instead, a diversity of resinous materials having a hydrophobic property can be used to form the gas-liquid separation layer.

The gas-liquid separation layers 82, 86 cooperate with the first metal net 81 and the second metal net 85 to uniformize the pressure of air supplied to the stack 10. The gas-liquid separation layer 82 installed on the first metal net 81 prevents the water generated in the cathode electrodes of the stack 10 from flowing backward to the blowing means when the fuel cell system is reversed. The gas-liquid separation layer 86 installed on the second metal net 85 prevents the water discharged out of the lower end of the stack 10 from leaking outside through the second metal net 85.

The heat pipe 90 is made of a metal such as iron, stainless steel, copper, and aluminum. The heat pipe 90 may be made of a metal having high heat conductivity, such as copper or aluminum. The heat pipe 90 is formed such that both ends of a plurality of plates, pipes or rods having a predetermined width or a diameter are respectively coupled to the first metal net 81 and the second metal net 85 in a state in which they are spaced apart from one another by a predetermined distance. Also, the heat pipe 90 can be formed as a single plate which has a width corresponding to that of the first metal net 81. The heat pipe 90 transfers heat of the second metal net 85 to the first metal net 81. Because the second metal net 85 is installed in the air discharge opening 72 of the second duct 71, due to the increased temperature of air having passed through the stack 10, the temperature of the second metal net 85 is also increased. Also, because the heat pipe 90 is connected to the second metal net 85 at one end thereof, heat is transferred from the second metal net 85 to the heat pipe 90 to increase the temperature of the heat pipe 90. Further, because the first metal net 81 is connected to the other end of the heat pipe 90, heat is transferred from the heat pipe 90 to the first metal net 81 to increase the temperature of the first metal net 81. Therefore, air which passes through the first metal net 81 is heated to a predetermined temperature by the heat of the first metal net 81 and then is supplied to the air paths 19. As a consequence, the stack 10 is supplied with air having increased temperature, and therefore, entire reaction efficiency of the stack 10 can be improved.

The heat pipe 90 may have a separate electric insulation layer 92 on a surface thereof facing the stack 10. Namely, the insulation layer 92 is provided between the heat pipe 90 and the stack 10 to prevent the heat pipe 90 and the stack 10 from being in electrical contact with each other. The insulation layer 92 can be formed on one surface of the heat pipe 90 or can be directly formed on the stack 10. The insulation layer 92 may be formed of an adhesive tape having an electric insulation property, or an organic material such as plastic. Also, in consideration of the temperature of the stack 10, the insulation layer 92 can be formed of a heat-resistant adhesive tape.

Figure 25:
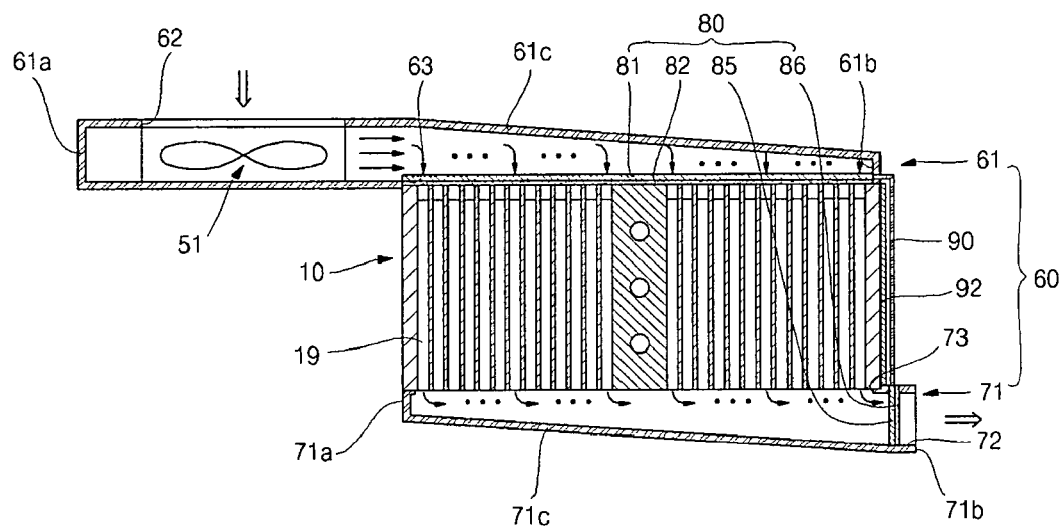
FIG. 25 is a cross-sectional view illustrating air flow through the stack in FIG. 23.
Figure 26:
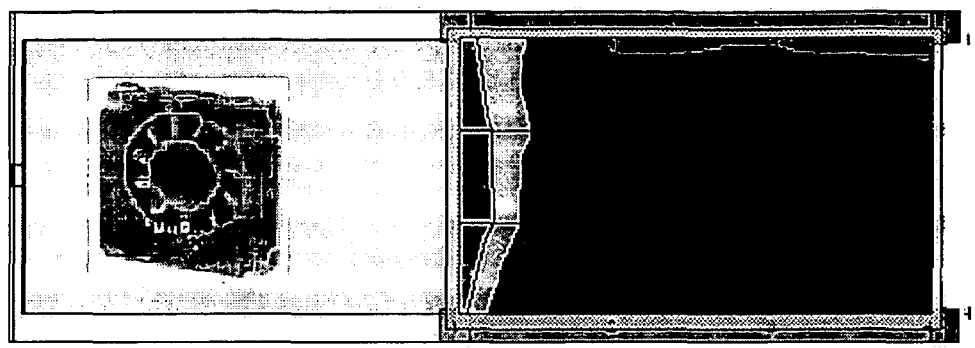
FIG. 26 is a computer graphic illustrating a distribution of air current velocities in the stack shown in FIG. 21.

FIG. 25 is a cross-sectional view illustrating air flow through the stack in FIG. 23. FIG. 26 is a computer graphic illustrating a distribution of air current velocities in the stack shown in FIG. 21. Here, explanations will be concentrated on the procedure for supplying air to the stack 10 by the air supply means 50. Because the procedure for supplying a fuel to the stack 10 by the fuel supply means 30 is well known to those skilled in the art; detailed explanations thereof will be omitted.

As the blowing means 51 disposed in the duct 60 is operated, the blowing means 51 sucks air downward through the air suction opening 62, and sucked air is emitted from the side of the blowing means 51 toward the second part of the first duct 61. The first duct 61 is structured to allow the air emitted from the blowing means 51 to flow toward the second part of the first duct 61. The upper wall 61c of the second part of the first duct 61 is downwardly inclined to ensure that the velocity of air current is not decreased adjacent to the other end 61b of the first duct 61. The air adjustment layer 80 entirely decreases and uniformizes the pressure of air supplied to the air paths 19. Air having passed through the first metal net 81 of the air adjustment layer 80 has constant pressure and is supplied to the air paths 19. Also, in the event that the gas-liquid separation layer 82 is formed on the first metal net 81, the gas-liquid separation layer 82 also increases pressure resistance to the air supplied. The second metal net 85 increases pressure resistance to the air having passed through the air paths 19 of the bipolar plates 16, by which the pressure of air having passed through the stack 10 is uniformized. Therefore, air supplied to the air paths 19 passes through the respective air paths 19 with the same velocity, whereby the air flow is uniformized. That is, as can be readily seen from FIG. 25, in the stack 10, the velocity of air supplied to the air paths 19 in lengthwise and widthwise directions is uniformized, and the amounts of air introduced into the air paths 19 are uniformized. The velocity distribution of air as shown in FIG. 26 represents the results obtained by measuring the velocities of air having passed through the air paths 19 at the lower ends of the air paths 19. Because the amount of air supplied to the air paths 19 is proportional to the product of the velocity of air and the sectional area of the corresponding air path 19, by measuring the velocities of air, it is possible to calculate the amount of air having passed through the air paths 19. Thus, as the velocities of air which passes through the air paths 19 are relatively uniformized, the amounts of air supplied to the respective air paths 19 are also uniformized. When numerically analyzed, with the air adjustment layer 80 installed, the velocity deviation of air by position, which is measured at the lower end of the stack 10, was 4 cm/s, which is very low. When the air adjustment layer 80 was not installed, the velocity deviation of air by position was 30 cm/s.

The heat pipe 90 is brought into contact with the first metal net 81 and the second metal net 85 and transfers the heat of the second metal net 85 to the first metal net 81. Therefore, as the temperature of air supplied to the stack 10 is increased, the efficiency and performance of the fuel cell system can be improved.

The air having passed through the first duct 61 flows out of the lower end of the stack 10 and is introduced into the second duct 71 through the air receiving opening 73 of the second duct 71. Due to the fact that the air paths 19 of the bipolar plates 16 are formed in the shape of a straight line extending in a vertical direction, smooth air flow can be ensured. The second duct 71 is coupled to the lower end of the stack 10 and is structured to allow the air introduced therein from the stack 10 to flow toward the other end 71b of the second duct 71. Because the height of the inside space of the second duct 71 gradually increases from one end 71a to the other end 71b of the second duct 71, the air introduced into the second duct 71 from the stack 10 can smoothly flow from one end 71a toward the other end 71b. The air flowing from one end 71a toward the other end 71b is discharged to the outside through the air discharge opening 72 which is formed through the other end 71b of the second duct 71.

Figure 27:
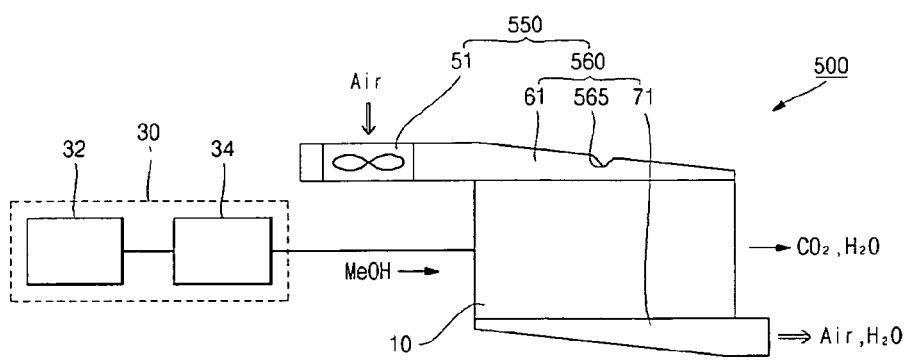
FIG. 27 is a schematic view illustrating the entire construction of a semi-passive type fuel cell system in accordance with a fifth embodiment of the present invention.
Figure 28:
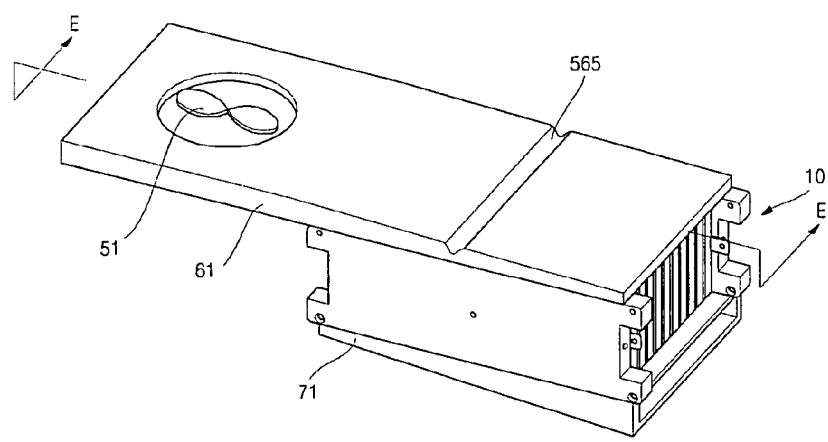
FIG. 28 is a perspective view illustrating the coupling relationship between the stack and blowing means shown in FIG. 27.
Figure 29:
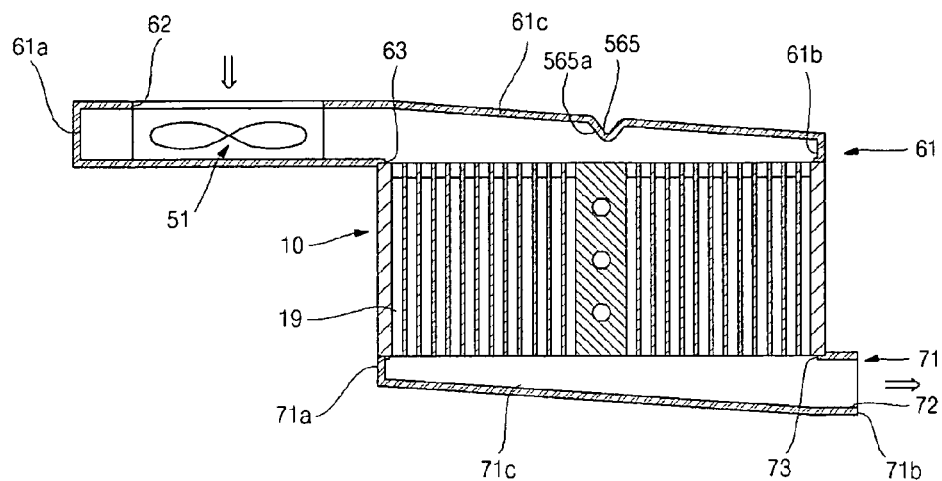
FIG. 29 is a cross-sectional view taken along the line E of FIG. 28.

FIG. 27 is a schematic view illustrating the entire construction of a semi-passive type fuel cell system in accordance with a fifth embodiment of the present invention. FIG. 28 is a perspective view illustrating the coupling relationship between the stack and blowing means shown in FIG. 27. FIG. 29 is a cross-sectional view taken along the line E of FIG. 28.

Referring to FIGS. 27 through 29, the semi-passive type fuel cell system 500 in accordance with the fifth embodiment of the present invention includes a stack 10, fuel supply means 30 for supplying a fuel to the stack 10, and air supply means 550 for supplying air to the stack 10. In the following descriptions given for the semi-passive type fuel cell system 500, the component parts which are the same as those of the semi-passive type fuel cell system 100 according to the first embodiment will be referenced by the same reference numerals, and detailed explanations thereof will be omitted.

The air supply means 550 includes blowing means 51 for sucking and discharging air, a duct 560 for supplying the air emitted from the blowing means 51 to the upper or the lower end of the stack 10, and air flow conversion means, that is, air adjustment means 565 for converting air flow in the duct 560.

The duct 560 includes a first duct 61 which is installed on the upper end of the stack 10 and a second duct 71 which is installed on the lower end of the stack 10. The blowing means 51 is installed inside or outside the first duct 61 or the second duct 71. The duct 60 functions to guide the air emitted from the blowing means 51 installed in a first part of the first duct 61 to the upper end of the stack 10 and to supply the air through the air paths 19.

The air adjustment means 565 is installed at a predetermined position on the upper wall 61c of a second part of the first duct 61 to convert a current direction of air emitted from the blowing means 51. The air adjustment means 565 is formed on the inner surface of the upper wall 61c of the second part of the first duct 61 to extend in the widthwise direction of the first duct 61, and projects downward by a predetermined length. The air adjustment means 565 partially converts air flow emitted from the blowing means 51 into a vertical downward direction. Therefore, on the second part of the first duct 61, while air flows toward the other end 61b of the first duct 61, the air partially flows toward the stack 10 at the position where the air adjustment means 565 is formed. Accordingly, as the air flowing toward the other end 61b of the first duct 61 is partially converted in direction, the velocity of air is relatively decreased. Also, because the air flowing toward the other end 61b of the first duct 61 is partially blocked by the air adjustment means 565, the amount of air flowing toward the other end 61b of the first duct 61 is relatively decreased. The air adjustment means 565 converts air flow over the upper end of the stack 10 and relatively decreases the velocity and amount of air flowing toward the other end 61b of the first duct 61. Therefore, the air paths 19a, 19b, which are formed on both parts of the bipolar plates 16 can be supplied with a relatively constant amount of air.

The air adjustment means 565 may be formed at the lengthwise middle portion of the second part of the first duct 61. That is, the air adjustment means 565 is positioned over the non-reaction regions or the non-formation regions 16c, 16d which are formed on the center part of the stack 10. Accordingly, the air adjustment means 565 enables air to be uniformly supplied to the air paths 19a, 19b which are formed on the one and the other parts of the bipolar plates 19.

The air adjustment means 565 can be formed integrally with the upper wall 61c of the first duct 61 such that the upper wall 61c of the first duct 61 projects inward. The air adjustment means 565 can be formed to have a substantially semi-circular sectional shape to minimize discontinuity of air flow. Also, the air adjustment means 565 is formed such that the frontal surface of the air adjustment means 565, which comes into direct contact with air, has the contour of an arc or defines an obtuse angle with respect to the air flow direction, to prevent air flow from being excessively blocked. In this case, the air adjustment means 565 is formed to have a triangular sectional shape to occupy a minimal space in the first duct 61. The air adjustment means 565 may be formed by a separate block which is coupled to the inner surface of the upper wall 61c of the second part of the first duct 61.

The air adjustment means 565 is formed to have a projection length which corresponds to 30-70% of the maximum inside height of the first duct 61 when measured from the upper wall 61c of the first duct 61 (more precisely, at a location where the air adjustment means 565 is provided). If the projection length of the air adjustment means 565 is less than 30% of the inside height of the first duct 61, the degree to which the air flow is converted is too small to reduce the effect of the installation of the air adjustment means 565. Also, if the projection length of the air adjustment means 565 is greater than 70% of the inside height of the first duct 61, the degree to which the air flow is converted is too large so that the amount of air supplied to the air paths 19*b* formed on the other parts of the bipolar plates 16 is relatively increased.

Figure 30:
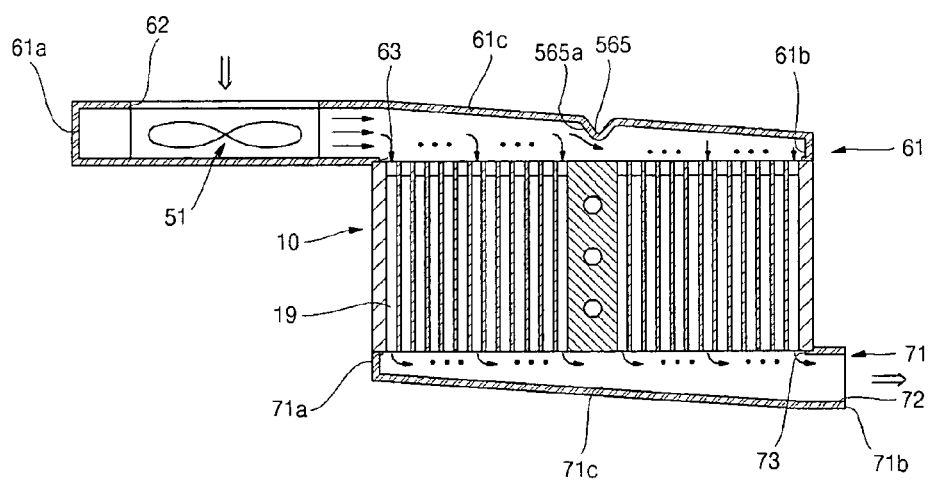
FIG. 30 is a cross-sectional view illustrating air flow through the stack in FIG. 29.
Figure 31:
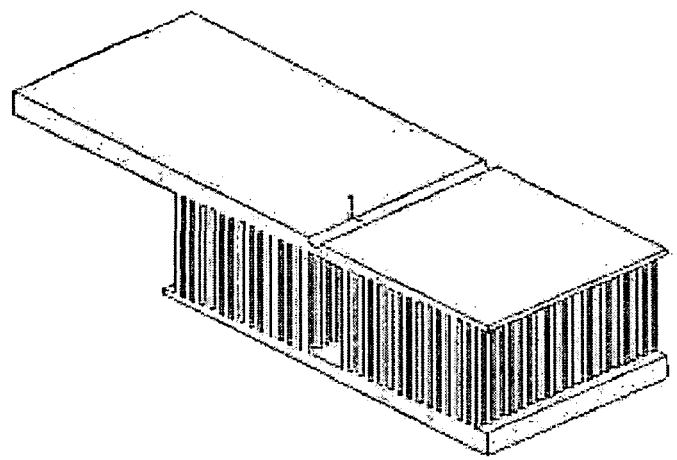
FIG. 31 is a computer graphic of the semi-passive type fuel cell system in accordance with the fifth embodiment of the present invention, which is used for simulating the velocities of air current in the stack.
Figure 32:
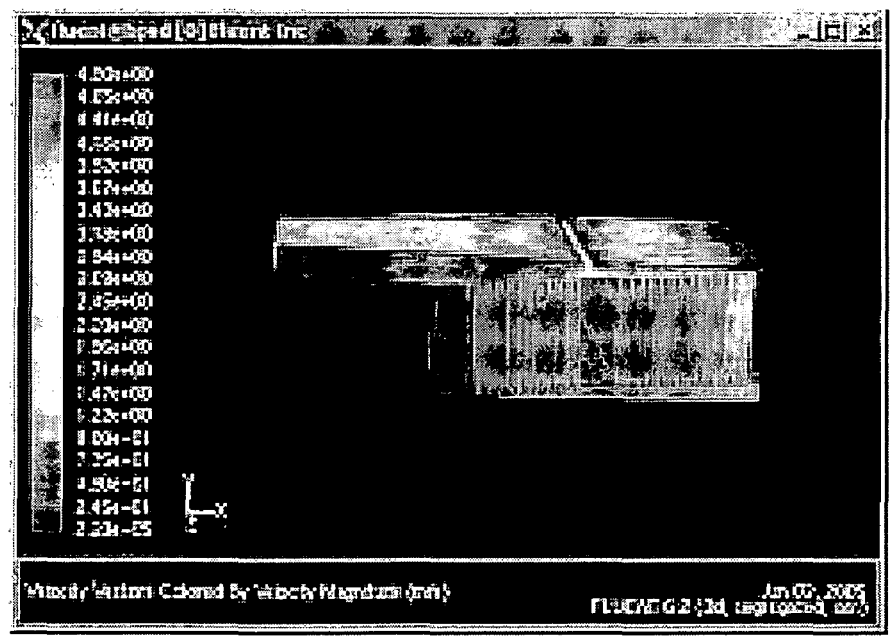
FIG. 32 is a computer graphic illustrating the simulation result for the velocities of air current in the stack, which is obtained through implementing numerical analysis.

FIG. 30 is a cross-sectional view illustrating air flow through the stack in FIG. 29. FIG. 31 is a computer graphic of the semi-passive type fuel cell system in accordance with the fifth embodiment of the present invention, which is used for simulating the velocities of air current in the stack. FIG. 32 is a computer graphic illustrating the simulation result for the velocities of air current in the stack, which is obtained through implementing numerical analysis. Here, explanations will be concentrated on the procedure for supplying air to the stack 10 by the air supply means 550. Because the procedure for supplying a fuel to the stack 10 by the fuel supply means 30 is well known to those skilled in the art, detailed explanations thereof will be omitted.

The blowing means 51 sucks air downward through the air suction opening 62, and sucked air is emitted from the side of the blowing means 51 toward the second part of the first duct 61. The first duct 61 is structured to allow the air emitted from the blowing means 51 to flow toward the second part of the first duct 61. The upper wall 61*c* of the second part of the first duct 61 is downwardly inclined to ensure that the velocity of air current is not decreased adjacent to the other end 61*b* of the first duct 61. The air adjustment means 565 partially converts air flow in the first duct 61 and relatively decreases the velocity and the amount of air flowing toward the other end 61*b* of the first duct 61. Therefore, the air paths 19*a*, 19*b* which are formed on the one and the other parts of the bipolar plates 16 are supplied with a uniformized amount of air. Namely, the air adjustment means 565 uniformizes the amount of air supplied to the air paths 19*a*, 19*b*.

The air having passed through the first duct 61 flows out of the lower end of the stack 10 and is introduced into the second duct 71 through the air receiving opening 73 of the second duct 71. Due to the fact that the air paths 19 of the bipolar plates 16 are formed in the shape of a straight line extending in a vertical direction, smooth air flow can be ensured. The second duct 71 is coupled to the lower end of the stack 10 and is structured to allow the air introduced therein from the stack 10 to flow toward the other end 71*b* of the second duct 71. Because the height of the inside space of the second duct 71 gradually increases from one end 71*a* to the other end 71*b* of the second duct 71, the air introduced into the second duct 71 from the stack 10 can smoothly flow from one end 71*a* toward the other end 71*b*. The air flowing from one end 71*a* toward the other end 71*b* is discharged to the outside through the air discharge opening 72 which is formed through the other end 71*b* of the second duct 71.

Figure 33:
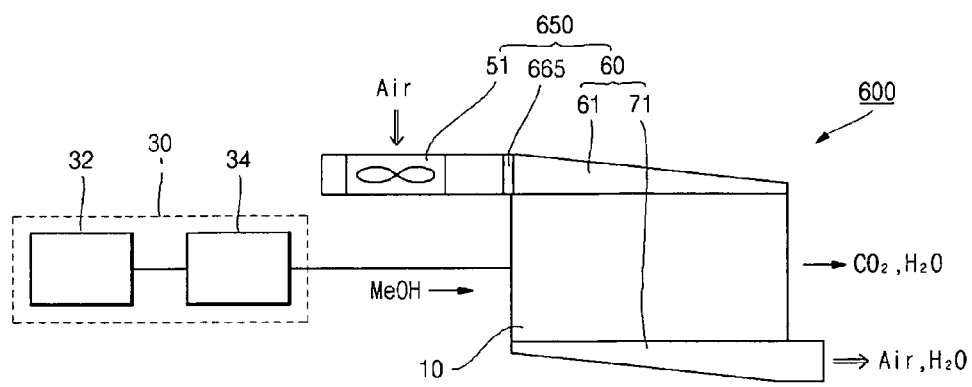
FIG. 33 is a schematic view illustrating the entire construction of a semi-passive type fuel cell system in accordance with a sixth embodiment of the present invention.
Figure 34:
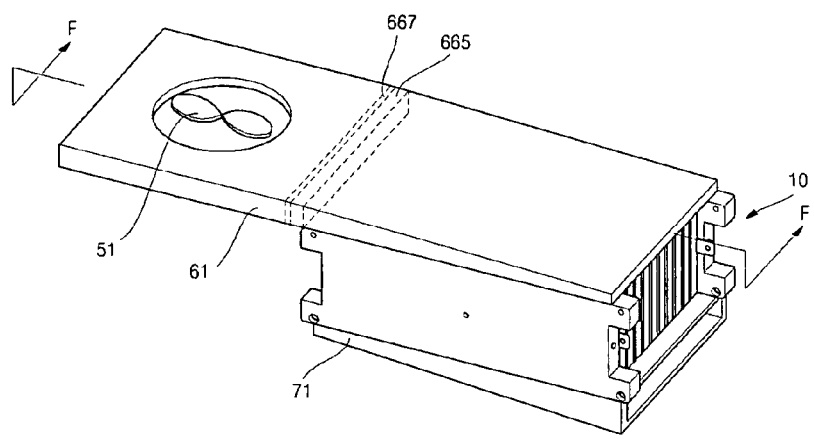
FIG. 34 is a perspective view illustrating the coupling relationship between the stack and blowing means shown in FIG. 33.
Figure 35:
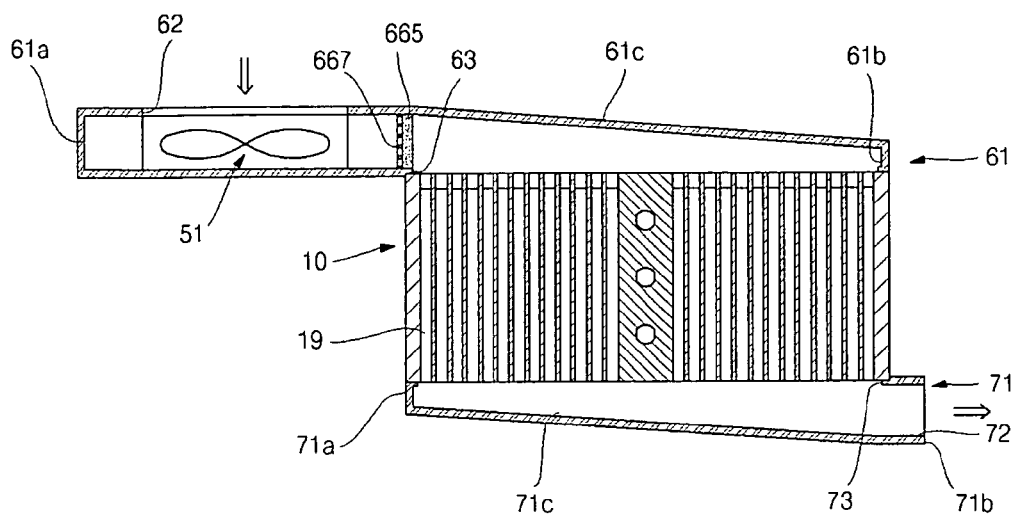
FIG. 35 is a cross-sectional view taken along the line F of FIG. 34.

FIG. 33 is a schematic view illustrating the entire construction of a semi-passive type fuel cell system in accordance with a sixth embodiment of the present invention. FIG. 34 is a perspective view illustrating the coupling relationship between the stack and blowing means shown in FIG. 33. FIG. 35 is a cross-sectional view taken along the line F of FIG. 34.

Referring to FIGS. 33 through 35, the semi-passive type fuel cell system 600 in accordance with the sixth embodiment of the present invention includes a stack 10, fuel supply means 30 for supplying a fuel to the stack 10, and air supply means 650 for supplying air to the stack 10. In the following descriptions given for the semi-passive type fuel cell system 600, the component parts which are the same as those of the semi-passive type fuel cell system 100 according to the first embodiment will be referenced by the same reference numerals, and detailed explanations thereof will be omitted.

The air supply means 650 includes blowing means 51 for sucking and discharging air, a duct 60 for supplying the air emitted from the blowing means 51 to the upper or the lower end of the stack 10, and a filter 665 installed in the duct 60 at a position separated from the blowing means 51 by a predetermined distance.

The filter 665 is formed of a porous material such as sponge, through which air can pass. The filter 665 can be formed as a gas-liquid separation layer which permits the passage of gas such as air but does not permit the passage of liquid. The filter 665 is formed to have an area which corresponds to the widthwise sectional area of the inside space of the first duct 61, and is installed in a direction perpendicular to the air flow in the first duct 61 at a position separated from the blowing means 51 by a predetermined distance. The filter 665 is installed in the first duct 61 between the blowing means 51 and the one upper end of the stack 10. The filter 665 may be installed at a position which corresponds to the one upper end of the stack 10.

The filter 665 entirely occupies the widthwise sectional area of the first duct 61 so that air can pass through the filter 665 in a state in which the pressure of the air emitted from the blowing means 51 is uniformized. Therefore, the filter 665 decreases an air pressure difference which can be produced in the widthwise direction of the first duct 61. As the air emitted from the blowing means 51 is spread in the widthwise direction while flowing in the first part toward the second part of the first duct 61 in front of the filter 665, a pressure difference may be produced in the widthwise direction of the first duct 61 downstream of the blowing means 51. Accordingly, the filter 665 installed in the first duct 61 on the one upper end of the stack 10 temporarily blocks the air to be supplied to the upper end of the stack 10 and uniformizes the air pressure in the widthwise direction of the first duct 61. The air having passed through the filter 665 is uniformized in pressure in the widthwise direction and flows into the second part of the first duct 61. Moreover, because the upper wall of the second part of the first duct 61 is inclined to have a predetermined inclination angle, the air can flow with a substantially constant velocity.

The filter 665 is formed to have predetermined air permeability. In other words, the filter 665 is formed to have appropriate air permeability in consideration of the pressure of air emitted from the blowing means 51, the air pressure needed to supply air to the air paths 19 of the bipolar plates 16, and the amount of air current. The air permeability of the filter 665 is determined depending upon the average size and the number of the pores formed in the filter 665.

The filter 665 is formed to have a predetermined thickness depending upon the average size of the pores formed therein, and can be secured to the inner surface of the first duct 61 by an adhesive layer. Also, the filter 665 can be securely supported by separate support means 667. The support means 667 is formed as a support plate that has pores with an average size greater than that of the pores of the filter 665. The filter 665 is secured to and supported by the support plate 667.

In the case where the filter 665 is formed as a gas-liquid separation layer, the filter 665 can be formed of one selected from the group consisting of polytetrafluoroethylene (PTFE), and a hydrophobic membrane including silicon resin. Also, the filter 665 can be formed of one or more of, but not limited to polyethylene (PE), polypropylene (PP), and polyethylene terephthalate (PET). Here, the material of the filter 665 is not limited to any particular ones, and instead, a diversity of resinous materials having a hydrophobic property can be used to form the gas-liquid separation layer. Further, the filter 665 can have a single-layered or a multi-layered structure. In the event that the filter 665 has a multi-layered structure, a plurality of polymer layers formed of the same material or different materials can be laminated with one another.

Figure 36:
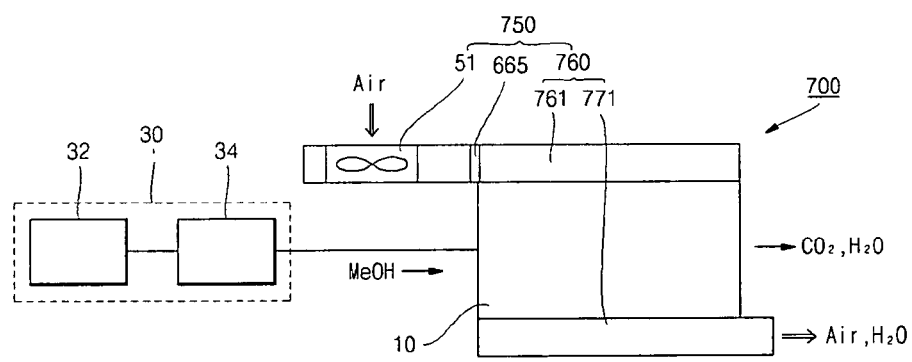
FIG. 36 is a schematic view illustrating the entire construction of a semi-passive type fuel cell system in accordance with a seventh embodiment of the present invention.

FIG. 36 is a schematic view illustrating the entire construction of a semi-passive type fuel cell system in accordance with a seventh embodiment of the present invention.

Referring to FIG. 36, the semi-passive type fuel cell system 700 in accordance with the sixth embodiment of the present invention includes a stack 10, fuel supply means 30 for supplying a fuel to the stack 10, and air supply means 750 for supplying air to the stack 10. In the following descriptions given for the semi-passive type fuel cell system 700, the component parts which are the same as those of the semi-passive type fuel cell system 600 according to the sixth embodiment will be referenced by the same reference numerals, and detailed explanations thereof will be omitted.

The air supply means 750 includes blowing means 51 for sucking and discharging air, a duct 760 for supplying the air emitted from the blowing means 51 to the upper or the lower end of the stack 10, and a filter 665 installed in the duct 760 at a position separated from the blowing means 51 by a predetermined distance.

The duct 760 includes a first duct 761 which is installed on the upper end of the stack 10 and a second duct 771 which is installed on the lower end of the stack 10. The blowing means 51 is installed inside or outside the first duct 761 or the second duct 771. The duct 760 functions to guide the air emitted from the blowing means 51 installed in a first part of the first duct 761 to the upper end of the stack 10 and to supply the air through the air path 19. While it is illustrated in this embodiment that the first duct 761 is installed on the upper end of the stack 10 and the second duct 771 is installed on the lower end of the stack 10, it is to be appreciated that the first duct 761 can be installed on the lower end of the stack 10 and the second duct 771 can be installed on the upper end of the stack 10 depending upon the design or the usage of a mobile communication terminal.

The first duct 761 is formed to have a hollow box-shaped configuration. The first duct 761 has a first part inside or outside which the blowing means 51 is arranged and a second part which is placed on the upper end of the stack 10. (Here, when viewed from FIG. 36, the first part of the first duct 761 corresponds to the left part in which the blowing means 51 is arranged and which projects outward from the upper end of the stack 10, and the second part of the first duct 761 corresponds to the right part which is placed on the upper end of the stack 10). The first duct 761 may be formed such that the first part of the first duct 761 has a height which substantially corresponds to that of the blowing means 51 and the blowing means 51 is disposed in the first part of the first duct 761. An air suction opening (not shown) (see FIG. 35) is formed through the upper wall of the first part of the first duct 761 such that the blowing means 51 can suck air through the air suction opening. The air suction opening may have an area which corresponds to the upper area of the blowing means 51. The first part of the first duct 761 is formed to have a uniform height such that sucked air can reliably flow toward the second part of the first duct 761. The one end of the first duct 761 is closed to prevent air sucked by the blowing means 51 from leaking outside. Consequently, the first duct 761 causes the air sucked by the blowing means 51 to be emitted toward the second part of the first duct 761.

The second part of the first duct 761 is formed to have a sectional area corresponding to the area of the upper end of the stack 10 and a predetermined height, such that the second part of the first duct 761 can cover the entire upper end of the stack 10. The lower wall of the second part of the first duct 761 which is to be brought into contact with the upper end of the stack 10 is opened to define an air supply opening (not shown) (see FIG. 35). The air supply opening may be formed to have a profile and an area which correspond to those of the upper end of the stack 10. Therefore, in the first duct 761, the air sucked through the air suction opening by the blowing means 51 in the first part is guided toward the second part and is supplied to the air paths 19 of the stack 10 through the air supply opening.

The second part of the first duct 761 may be formed to have a constant height. Therefore, the second part of the first duct 761 may be formed to have a constant sectional area even when the second part of the first duct 761 faces away from the blowing means 51.

Similar to the first duct 761, the second duct 771 is formed in a hollow box-shaped configuration. The second duct 771 is installed on the lower end of the stack 10 to cover the lower end of the stack 10. An air receiving opening (not shown) (see FIG. 35) is formed through the upper wall of the second duct 771 to have an area corresponding to that of the lower end of the stack 10. One end of the second duct 771 is closed, and the other end of the second duct 771 is opened to define an air discharge opening (not shown) (see FIG. 35). Accordingly, the second duct 771 functions to discharge air having passed through the stack 10 to the outside.

Also, the second duct 771 is formed to have a constant height. The second duct 771 provides a drain passage of the water produced by the reaction in the cathode electrodes 15 of the stack 10. In this regard, a separate piping for collecting water can be provided to the other end of the second duct 771.

The filter 665 is formed of a porous material such as sponge, through which air can pass. The filter 665 can be formed as a gas-liquid separation layer which permits the passage of gas such as air but does not permit the passage of liquid. The filter 665 is formed to have an area which corresponds to the widthwise sectional area of the inside space of the first duct 761, and is installed in a direction perpendicular to the air flow in the first duct 761 at a position 25 separated from the blowing means 51 by a predetermined distance. The filter 665 is installed in the first duct 761 between the blowing means 51 and the one upper end of the stack 10. The filter 665 may be installed at a position which corresponds to the one upper end of the stack 10.

The filter 665 entirely occupies the widthwise sectional area of the first duct 761 so that air can pass through the filter 665 in a state in which the pressure of the air emitted from the blowing means 51 is uniformized. Therefore, the filter 665 decreases an air pressure difference which can be produced in the widthwise direction of the first duct 761. Accordingly, the filter 665 installed in the first duct 761 on the one upper end of the stack 10 temporarily blocks the air to be supplied to the upper end of the stack 10 and uniformizes the air pressure in the widthwise direction of the first duct 761. The air having passed through the filter 665 is uniformized in pressure in the widthwise direction and flows into the second part of the first duct 761. While the second part of the first duct 761 is formed to have a constant height, because 10 the filter 665 decreases the pressure of air supplied to the second part of the first duct 761, air can be uniformly supplied to the upper end of the stack 10.

Figure 37:
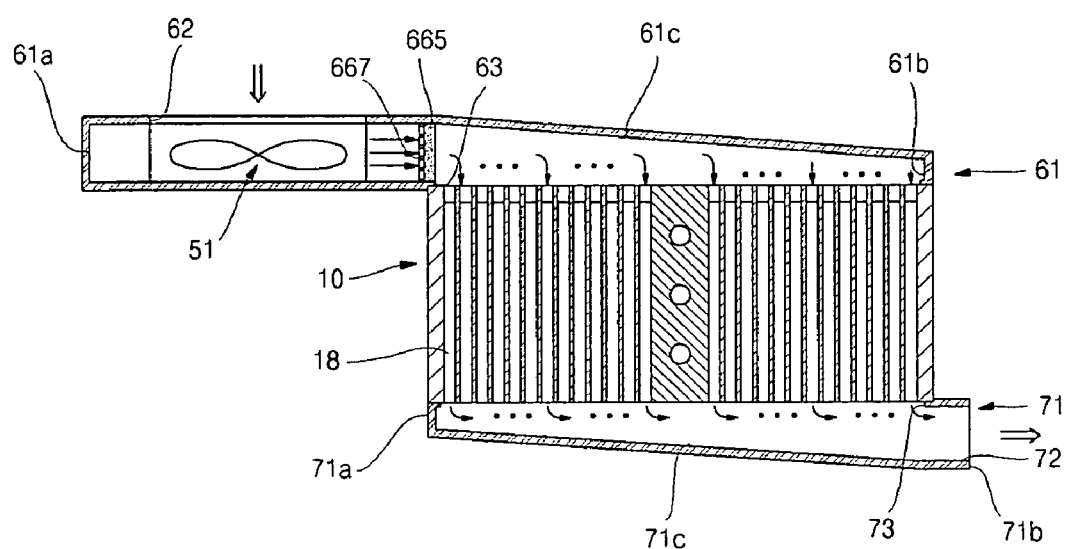
FIG. 37 is a cross-sectional view illustrating air flow through the stack in FIG. 35.
Figure 38:
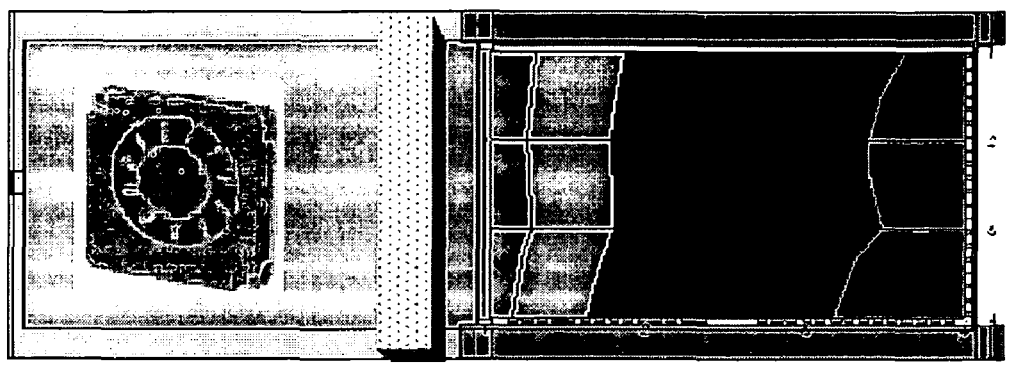
FIG. 38 is a computer graphic illustrating a distribution of air current velocities in the stack shown in FIG. 35.
Figure 39:
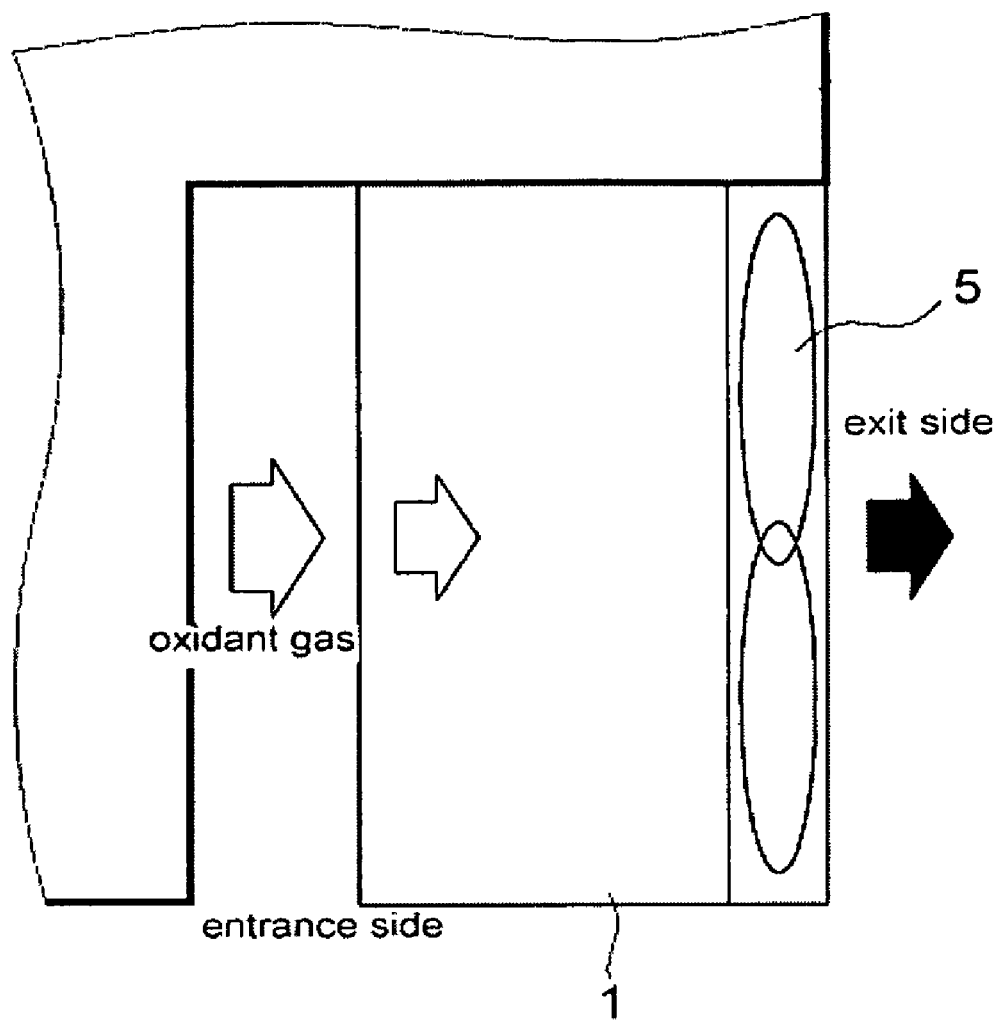
FIG. 39 is a schematic view illustrating the stack and the blowing means of a conventional semi-passive type fuel cell system.

FIG. 37 is a cross-sectional view illustrating air flow through the stack in FIG. 35. FIG. 38 is a computer graphic illustrating a distribution of air current velocities in the stack shown in FIG. 33.

As the blowing means 51 of the air supply means 650 is operated, the blowing means 51 sucks air downward through the air suction opening 62, and sucked air is emitted from the side of the blowing means 51 toward the second part of the first duct 61. The first duct 61 is structured to allow the air emitted from the blowing means 51 to flow toward the second part of the first duct 61. The upper wall 61c of the second part of the first duct 61 is downwardly inclined to ensure that the velocity of air current is not decreased adjacent to the other end 61b of the first duct 61. The filter 665 temporarily blocks the air flow in the first duct 61 and uniformizes the pressure of air to be supplied to the second part of the first duct 61 in the widthwise direction of the first duct 61. Because the upper wall 61c of the second part of the first duct 61 is formed to be inclined, the current velocities of the air having passed through the filter 665 are uniformized. Therefore, the filter 665 allows air to be introduced into the air paths 19 of the bipolar plates 16 with a constant velocity, and uniformizes the amounts of air introduced into the respective air paths 19. That is, in the stack 10, as can be readily seen from FIG. 37, air velocity is uniformized in the widthwise direction of the first duct 61, and the amounts of air introduced into the air paths 19 are also uniformized. The velocity distribution (brightness distribution) of air as shown in FIG. 38 represents the results obtained by measuring the velocities of air having passed through the air paths 19 at the lower ends of the air paths 19. Because the amount of air supplied to the air paths 19 is proportional to the product of the velocity of air and the sectional area of the corresponding air path 19, by measuring the velocities of air, it is possible to calculate the amounts of air having passed through the air paths 19. When numerically analyzed, in the case of installing the filter 665, the velocity deviation of air by positions, which is measured at the lower end of the stack 10, was 4 cm/s, which is very low. When the filter 665 was not installed, a velocity deviation of air by positions was 30 cm/s.

The air having passed through the first duct 61 flows out of the lower end of the stack 10 and is introduced into the second duct 71 through the air receiving opening 73 of the second duct 71. Due to the fact that the air paths 19 of the bipolar plates 16 are formed in the shape of a straight line extending in a vertical direction, smooth air flow can be ensured. The second duct 71 is coupled to the lower end of the stack 10 and is structured to allow the air introduced therein from the stack 10 to flow toward the other end 71b of the second duct 71. Because the height of the inside space of the second duct 71 gradually increases from one end 71a to the other end 71b of the second duct 71, the air introduced into the second duct 71 from the stack 10 can smoothly flow from one end 71a toward the other end 71b. The air flowing from one end 71a toward the other end 71b is discharged to the outside through the air discharge opening 72 which is formed through the other end 71b of the second duct 71.

As is apparent from the above description, the semi-passive type fuel cell system according to the present embodiments provides advantages in that, because blowing means such as a blower or a fan is provided on one side over the upper end of a stack and air is supplied through a duct which connects the blowing means to the upper end of the stack, when compared to the case where air is directly supplied to the upper end of the stack from above, it is possible to uniformly supply air to the air paths formed in each bipolar plate of the stack irrespective of the positions of the air paths.

Also, in an embodiment, the air paths of each bipolar plate are formed such that the sectional areas of the air paths gradually decrease as they face away from the blowing means. Thus, even when the amount of air supplied from the blowing means is substantial, it is possible to uniformly supply air to the air paths of the bipolar plate irrespective of the positions of the air paths.

Further, in an embodiment, an air adjustment layer is installed on the upper ends of the air paths of the stack in the duct the upper wall of which is inclined. Therefore, the pressure of air supplied to the air paths of the stack is uniformized, and it is possible to supply air at a uniform current velocity and in a uniform amount.

Moreover, in an embodiment, an air adjustment means is installed on the inner surface of the duct the upper wall of which is inclined, at a predetermined position over the stack, to change air flow in the duct and adjust the current velocity and the amount of air supplied to the other end of each bipolar plate. Consequently, it is possible to uniformly supply air to the air paths of the bipolar plate irrespective of the positions of the air paths.

Furthermore, in an embodiment, a filter is installed inside the duct the upper wall of which is inclined, at a position separated from the blowing means by a predetermined distance, to uniformize air pressure in the widthwise direction of the duct and air current velocity on the upper end of the stack. As a result, it is possible to uniformly supply air to the air paths of the bipolar plate.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A semi-passive type fuel cell system comprising:
a stack having a stack upper end, a stack lower end, and a plurality of unit cells laterally stacked with one another, each unit cell including a membrane-electrode assembly and bipolar plates located on both sides of the membrane-electrode assembly, the membrane-electrode assembly having an electrolyte membrane, a cathode electrode, and an anode electrode, the electrolyte membrane having an electrolyte membrane first side surface and an electrolyte membrane second side surface, the cathode electrode being formed on the electrolyte membrane first side surface and the anode electrode being formed on the electrolyte membrane second side surface, the bipolar plates each having a bipolar plate upper end and a bipolar plate lower end;
a heat transfer device configured to transfer heat from the stack lower end to the stack upper end comprising:
a first heat transfer structure on the stack upper end;
a second heat transfer structure on the stack lower end; and
a heat pipe coupled to the first heat transfer structure and the second heat transfer structure and configured to transfer heat from the second heat transfer structure to the first heat transfer structure;
means for supplying fuel to the stack; and
means for supplying air to the stack,
wherein each of the bipolar plates has air paths formed on a surface facing and contacting the cathode electrode and extending in an air path direction from the bipolar plate upper end to the bipolar plate lower end;
wherein the means for supplying air includes ducts respectively installed on the stack upper end and the stack lower end and includes means for blowing air through the ducts,
wherein the ducts comprise a first duct installed on the stack upper end and a second duct installed on the stack lower end, the first duct including a first duct first part and a first duct second part;

wherein the means for blowing air through the stack are installed in the first duct first part and are offset from the air paths in a direction perpendicular to the air path direction;

wherein the first duct second part includes a first duct second part left end and a first duct second part right end, the first duct second part left end being closest to the means for blowing air; and wherein an upper wall of the first duct second part is inclined downwards to have a predetermined inclination angle so that a height of the upper wall gradually decreases from the first duct second part left end to the first duct second part right end.

2. The fuel cell system as claimed in claim 1, wherein the air paths of the bipolar plates are in a straight line extending from the stack upper end to the stack lower end.

3. The fuel cell system as claimed in claim 1, wherein the first duct second part covers entirely the stack upper end; and wherein an air suction opening is formed through an upper wall of the first duct first part directly above the means for blowing air, and an air supply opening for supplying air to the stack is formed through a lower wall of the first duct second part to have an area corresponding to an area of the stack upper end.

4. The fuel cell system as claimed in claim 3, wherein the first duct first part has a height substantially corresponding to a height of the means for blowing air; and wherein the means for blowing air is installed such that the means for blowing air sucks air through the air suction opening and supplies sucked air to the first duct second part.

5. The fuel cell system as claimed in claim 3, wherein the second duct includes a second duct left end and a second duct right end, and wherein an air receiving opening for receiving air having passed through the stack is formed through an upper wall of the second duct to have an area corresponding to an area of the stack lower end, and an air discharge opening for discharging air to the outside is formed through the second duct right end.

6. The fuel cell system as claimed in claim 5, wherein a lower wall of the second duct is inclined downwards to have a predetermined inclination angle so that a height of the lower wall gradually increases from the second duct left end to the second duct right end.

7. The fuel cell system as claimed in claim 6, wherein the lower wall of the second duct is inclined at the same inclination angle as the upper wall of the first duct.

8. The fuel cell system as claimed in claim 1, wherein the means for blowing air includes a blower or a fan.

9. The fuel cell system as claimed in claim 3, wherein the bipolar plates have a bipolar plate first part and a bipolar plate second part, and wherein the air paths of the bipolar plates are formed such that sectional areas of the air paths formed on the bipolar plate first part are different from the air paths formed on the bipolar plate second part.

10. The fuel cell system as claimed in claim 9, wherein the air paths of the bipolar plate are formed such that sectional areas of the air paths formed on the bipolar plate first part, which is closest to the means for blowing air, are greater than sectional areas of the air paths formed on the bipolar plate second part.

11. The fuel cell system as claimed in claim 10, wherein the air paths of the bipolar plate are formed such that sectional areas of the air paths gradually decrease from the bipolar plate first part to the bipolar plate second part.

12. The fuel cell system as claimed in claim 3, wherein the means for supplying air further includes an air adjustment layer formed on the stack upper end to cover a zone including a region in which the air paths are formed.

13. The fuel cell system as claimed in claim 12, wherein the air adjustment layer is coupled to the first duct to occupy entirely the air supply opening.

14. The fuel cell system as claimed in claim 12, wherein the air adjustment layer is formed of a porous material through which air can pass.

15. The fuel cell system as claimed in claim 14, wherein the air adjustment layer is formed of a porous material having pores which possess sectional areas less than sectional areas of the air paths.

16. The fuel cell system as claimed in claim 12, wherein the air adjustment layer is formed as a gas-liquid separation layer by one selected from the group consisting of polytetrafluoroethylene, silicon resin, polyethylene, polypropylene, and polyethylene terephthalate.

17. The fuel cell system as claimed in claim 12, wherein the air adjustment layer is formed of a wiper or a breathable material.

18. The fuel cell system as claimed in claim 12, wherein the air adjustment layer includes a first metal net through which air can pass, the first metal net being formed by a metal sieve or a porous metal foam, wherein the first metal net constitutes the first heat transfer structure.

19. The fuel cell system as claimed in claim 18, wherein the first metal net is formed such that openings of the first metal net have sizes smaller than sizes of the openings of the air paths.

20. The fuel cell system as claimed in claim 18, wherein the first metal net further includes a gas-liquid separation layer formed on one entire surface of the first metal net.

21. The fuel cell system as claimed in claim 20, wherein the gas-liquid separation layer is formed of one selected from the group consisting of polytetrafluoroethylene, silicon resin, polyethylene, polypropylene, and polyethylene terephthalate.

22. The fuel cell system as claimed in claim 18, further comprising a second metal net formed on the stack lower end to cover a zone including a region having air paths, wherein the second metal net constitutes the second heat transfer structure.

23. The fuel cell system as claimed in claim 22, wherein the second metal net allows air to pass and is formed by a metal sieve or a porous metal foam.

24. The fuel cell system as claimed in claim 23, wherein the second metal net further includes a gas-liquid separation layer formed on one entire surface of the second metal net.

25. The fuel cell system as claimed in claim 24, wherein the gas-liquid separation layer is formed of one selected from the group consisting of polytetrafluoroethylene, silicon resin, polyethylene, polypropylene, and polyethylene terephthalate.

26. The fuel cell system as claimed in claim 22, wherein the heat pipe is connected to the first metal net and the second metal net.

27. The fuel cell system as claimed in claim 26, wherein the heat pipe includes a plurality of bars, rods, or plates spaced apart from one another by a predetermined interval in a widthwise direction of the first metal net.

28. The fuel cell system as claimed in claim 26, wherein the heat pipe is a single plate having a width corresponding to a width of the first metal net and a predetermined thickness.

29. The fuel cell system as claimed in claim 26, wherein the heat pipe is formed of copper or aluminum metal.

30. The fuel cell system as claimed in claim 26, wherein an electrical insulation layer is formed between the heat pipe and the stack.

31. The fuel cell system as claimed in claim 3,
wherein the means for supplying air further includes air adjustment means formed on an inner surface of the first duct at a position separated from the means for blowing air by a predetermined distance,
wherein the air adjustment means extends in a widthwise direction of the first duct and projects downwards by a predetermined length.

32. The fuel cell system as claimed in claim 31, wherein the air adjustment means is formed at a lengthwise middle portion of the first duct second part.

33. The fuel cell system as claimed in claim 31, wherein the air adjustment means is a protrusion, the protrusion being formed integrally with the first duct and protruding inwards in the upper wall of the first duct.

34. The fuel cell system as claimed in claim 31, wherein the air adjustment means is formed by a separate block coupled to an inner surface of the upper wall of the first duct second part.

35. The fuel cell system as claimed in claim 31, wherein the air adjustment means has a semi-circular shape or triangular sectional shape.

36. The fuel cell system as claimed in claim 31, wherein the air adjustment means is a frontal surface directly contacting with air, the frontal surface having an obtuse angle with respect to an air flow direction or having an arc contour.

37. The fuel cell system as claimed in claim 31, wherein the air adjustment means has a projection length corresponding to 30%-70% of an inside height of the first duct at a location where the air adjustment means is provided.

38. The fuel cell system as claimed in claim 1, wherein the fuel cell system is a direct methanol fuel cell system or a polymer electrolyte membrane fuel cell system.

* * * * *